United States Patent [19]

Moskovitz et al.

[11] Patent Number: 5,955,393
[45] Date of Patent: Sep. 21, 1999

[54] ENHANCED ADSORBENT AND ROOM TEMPERATURE CATALYST PARTICLE AND METHOD OF MAKING THEREFOR

[75] Inventors: Mark L. Moskovitz; Bryan E. Kepner, both of Atlanta, Ga.

[73] Assignee: Project Earth Industries, Inc., Atlanta, Ga.

[21] Appl. No.: 08/734,329

[22] Filed: Oct. 21, 1996

Related U.S. Application Data

[63] Continuation-in-part of application No. PCT/US96/05303, Apr. 17, 1996, which is a continuation-in-part of application No. 08/426,981, Apr. 21, 1995, abandoned.

[51] Int. Cl.$^6$ .......................... B01J 27/34; C01B 53/00; H05F 3/00
[52] U.S. Cl. .................. 502/5; 502/64; 502/305; 502/324; 502/326; 502/337; 502/338; 502/340; 502/343; 502/345; 502/347; 502/349; 502/350; 502/352; 502/353; 502/407; 502/415; 502/416; 502/432; 204/157.44; 204/164
[58] Field of Search .................. 502/5, 34, 56, 502/400, 415, 416, 432, 407, 305, 326, 324, 337, 338, 340, 343, 345, 347, 349, 350, 352, 353, 64; 204/157.44, 164

[56] References Cited

U.S. PATENT DOCUMENTS

| 2,915,365 | 12/1959 | Saussol ................................... 23/142 |
| 3,158,578 | 11/1964 | Pons et al. .............................. 252/436 |

(List continued on next page.)

FOREIGN PATENT DOCUMENTS

| 1084477 | 8/1980 | Canada . |
| 0 224 375 A2 | 6/1987 | European Pat. Off. . |
| 0 395 203 | 10/1990 | European Pat. Off. . |
| 0 525 631 A1 | 2/1993 | European Pat. Off. . |
| 0 473 680 B1 | 8/1993 | European Pat. Off. . |
| 2124623 | 9/1972 | France . |
| 2318680 | 2/1977 | France . |
| 2527197 | 6/1982 | France . |
| 44 20 614 A1 | 6/1994 | Germany . |
| 53-31599 | 3/1976 | Japan . |
| 53-31586 | 3/1978 | Japan . |
| 54-10288 | 1/1979 | Japan . |
| 54-28287 | 3/1979 | Japan . |
| 54-141375 | 11/1979 | Japan . |
| 56-121637 | 9/1981 | Japan . |
| 56121637 A2 | 9/1981 | Japan . |
| 61-233065 A2 | 10/1981 | Japan . |
| 57-171435 | 10/1982 | Japan . |
| 58-156349 | 9/1983 | Japan . |
| 60-255681 | 12/1985 | Japan . |
| 63-062546 | 3/1988 | Japan . |
| 1-164781 | 6/1989 | Japan . |
| 4-23577 | 4/1992 | Japan . |
| 98720 | 4/1990 | Romania . |
| 604947 | 11/1945 | United Kingdom . |
| 894625 | 4/1962 | United Kingdom . |
| WO 93/05879 | 4/1993 | WIPO . |
| WO 94/26661 | 11/1994 | WIPO . |
| WO 95/34378 | 12/1995 | WIPO . |
| WO 96/17682 | 6/1996 | WIPO . |
| WO 96/33013 | 10/1996 | WIPO . |

OTHER PUBLICATIONS

Fukuzuka et al. Oxyacid Anion Adsorbent, 91: 9908p; Chemical Abstracts, vol. 91, 1979, p. 310.

Youssef et al. Oxidation of Carbon Monoxide Over Alumina–Supported Metal Oxide Catalysts, vol. 12, No. 4, pp. 335–343, 1995.

Sultan et al. Catalytic Dehydrogenation and Cracking of Cyclohexane over $Ni/Al_2O_3$ Solids, Adsorption Science & Technology, vol. 12, No. 1, pp. 1–6, 1995.

Jha et al. Chromatographic Utilization of the Sorption Behaviour of Some Nitrophenols on Acid–treated Alumina, Absorption Science & Technology, vol. 9, No. 2, pp. 92–108, 1992.

Ames et al., "Phosphorus Removal From Effluents in Alumina Columns," J. Water Pollution Control Federation, vol. 42, No. 5, Part 2, pp. R161–R172 (May 1970).

Batchelor et al., "A Surface Complex Model for Adsorption of Trace Components from Wastewater," J. Water Pollution Control Federation, vol. 59, No. 12, pp. 1059–1068 (Dec. 1987).

Brattebo et al., "Phosphorus Removal By Granular Activated Alumina," Wat.Res., vol. 20, No. 8, pp. 977–986 (1986).

Huang, "Removal of Phosphate By Powdered Aluminum Oxide Adsorption," J. Water Pollution Control Federation, vol. 7, pp. 1811–1817 (Aug. 1977).

Gangoli et al., "Phosphate Adsorption Studies," J. Water Pollution Control Federation, vol. 45, No. 5, pp. 842–849 (May 1973).

Gangoli et al., "Kinetics of Phosphate Adsorption on Alumina and Fly Ash," vol. 46, No. 8, pp. 2035–2042 (Aug. 1974).

Neufeld et al., "Removal of Orthophosphates form Aqueous Solutions with Activated Alumina," Enviromental Science and Technology, vol. 3, No. 7, pp. 661–667 (Jul. 1969).

(List continued on next page.)

*Primary Examiner*—Glenn Caldarola
*Assistant Examiner*—In Suk Bullock
*Attorney, Agent, or Firm*—Needle & Rosenberg, P.C.

[57] ABSTRACT

A method for producing an enhanced adsorbent and/or enhanced catalytic particle and/or for producing a catalytic particle, comprising the steps of: (a) removing an effective amount of air from a closed chamber containing an adsorbent and/or catalytic particle, wherein the resultant chamber pressure is less than one atmosphere; (b) raising the chamber pressure with an inert gas to at least one atmosphere; (c) contacting the particle with an energy beam of sufficient energy for a sufficient time to thereby enhance the adsorbent and/or catalytic properties of the particle and/or produce catalytic properties in the particle. A continuous process directed to step (c) alone is also provided. Also disclosed are adsorbent and/or catalytic particles, methods of contaminant reduction or elimination, including room temperature catalysis, particle binders, apparatuses of the present invention, and methods of increasing the surface area of adsorbent and/or catalytic particles.

38 Claims, 4 Drawing Sheets

U.S. PATENT DOCUMENTS

| | | | |
|---|---|---|---|
| 3,222,129 | 12/1965 | Osment et al. | 23/141 |
| 3,360,134 | 12/1967 | Pullen | 210/502 |
| 3,485,771 | 12/1969 | Horvath | 252/430 |
| 3,726,811 | 4/1973 | Toombs et al. | 252/463 |
| 3,803,010 | 4/1974 | Seaman et al. | 204/157.1 H |
| 3,819,532 | 6/1974 | Cracknell et al. | 252/447 |
| 3,875,125 | 4/1975 | Whitehurst | 260/79.5 R |
| 3,890,245 | 6/1975 | Berg et al. | 252/447 |
| 3,931,049 | 1/1976 | Ford et al. | 252/455 R |
| 3,935,098 | 1/1976 | Oda et al. | 210/38 |
| 3,945,945 | 3/1976 | Kiovsky et al. | 252/463 |
| 3,958,341 | 5/1976 | Podschus | 34/12 |
| 3,997,476 | 12/1976 | Cull | 252/463 |
| 4,017,425 | 4/1977 | Shiao | 252/453 |
| 4,051,072 | 9/1977 | Bedford et al. | 252/464 |
| 4,125,457 | 11/1978 | Brennan et al. | 208/254 |
| 4,166,100 | 8/1979 | Vorobiev et al. | 423/626 |
| 4,177,139 | 12/1979 | Hahn et al. | 210/33 |
| 4,309,315 | 1/1982 | Nakamura | 252/472 |
| 4,349,637 | 9/1982 | Miedaner et al. | 501/126 |
| 4,393,311 | 7/1983 | Feldman et al. | 250/459.1 |
| 4,442,223 | 4/1984 | Chester et al. | 502/68 |
| 4,499,208 | 2/1985 | Fuderer | 502/415 |
| 4,508,835 | 4/1985 | Kaniuk et al. | 501/94 |
| 4,547,487 | 10/1985 | Vogel et al. | 502/351 |
| 4,551,254 | 11/1985 | Imada et al. | 210/688 |
| 4,558,031 | 12/1985 | Ternan et al. | 502/355 |
| 4,579,839 | 4/1986 | Pearson | 502/439 |
| 4,764,394 | 8/1988 | Conrad | 427/38 |
| 4,795,735 | 1/1989 | Liu et al. | 502/415 |
| 4,835,338 | 5/1989 | Liu | 585/823 |
| 4,843,034 | 6/1989 | Herndon et al. | 437/189 |
| 4,874,596 | 10/1989 | Lemelson | 423/446 |
| 4,885,065 | 12/1989 | Gilgenbach | 204/157.6 |
| 4,902,666 | 2/1990 | Rainis | 502/439 |
| 4,923,843 | 5/1990 | Saforo et al. | 502/415 |
| 4,943,356 | 7/1990 | Dietrich | 204/157.3 |
| 5,087,589 | 2/1992 | Chapman et al. | 437/195 |
| 5,186,903 | 2/1993 | Cornwell | 422/122 |
| 5,204,070 | 4/1993 | Wilson et al. | 422/186 |
| 5,212,131 | 5/1993 | Belding | 502/60 |
| 5,218,179 | 6/1993 | Matossian et al. | 219/121.43 |
| 5,227,358 | 7/1993 | Takemura et al. | 502/316 |
| 5,236,471 | 8/1993 | Van Dijen | 51/293 |
| 5,238,888 | 8/1993 | Abe | 502/5 |
| 5,242,879 | 9/1993 | Abe et al. | 502/180 |
| 5,244,648 | 9/1993 | Dupin et al. | 423/626 |
| 5,262,198 | 11/1993 | Wu et al. | 427/249 |
| 5,366,948 | 11/1994 | Absil et al. | 502/68 |
| 5,414,204 | 5/1995 | Hosono et al. | 588/210 |
| 5,422,323 | 6/1995 | Banerjee et al. | 501/100 |
| 5,427,995 | 6/1995 | Ziebarth et al. | 502/411 |
| 5,476,826 | 12/1995 | Greenwald et al. | 502/180 |
| 5,628,881 | 5/1997 | Lemelson | 204/164 |

OTHER PUBLICATIONS

Shiao et al., "Phosphate Removal from Aqueous Solution from Activated Red Mud," J. Water Pollution Control Federation, vol. 49, pp. 280–285 (Feb. 1977).

Urano et al., "Process Development for Removal and Recovery of Phosphorus from Wastewater by a New Adsorbent. 1. Preparation Method and Adsorption Capability of a New Adsorbent, " Ind.Eng.Chem.Res., vol. 30, No. 8, pp. 1893–1896 (1991).

Urano et al., "Process Development for Removal and Recovery of Phosphorus from Wastewater by a New Adsorbent. 2. Adsorption Rates and Breakthrough Curves," Ind.Eng.Chem.Res., vol. 30, No. 8, pp. 1897–1899 (1991).

Winkler et al., "Kinetics of Orthophosphate Removal from Aqueous Solutions by Activated Alumina," J. Water Pollution Control Federation, vol. 43, No. 3, Part 1, pp. 474–482 (Mar. 1971).

Yee, "Selective Removal of Mixed Phosphates by Activated Alumina," J. Amer. Water Works Assoc., vol. 58, pp. 239–247 (1966).

Kaufman et al. "Characteristics, Capabilities, and Applications of Broad Beam Sources," Commonwealth Scientific Corporation, 1987.

ENHANCED ADSORBENT AND ROOM TEMPERATURE CATALYST PARTICLE AND METHOD OF MAKING THEREFOR

CROSS REFERENCE TO RELATED APPLICATIONS

This application is (1) a continuation-in-part of PCT/US96/05303, filed Apr. 17, 1996, pending, which is a continuation-in-part of U.S. application Ser. No. 08/426,981, filed Apr. 21, 1995, now abandoned. All of the above applications are hereby incorporated by this reference in their entireties for all of their teachings.

BACKGROUND OF THE INVENTION

1. Field of the Invention

This invention relates generally to adsorbent particles that have improved adsorbent properties and/or improved or newly existing catalytic properties, including room temperature catalytic capability.

2. Background Art

Oxides of metals and certain non-metals are known to be useful for removing contaminants from a gas or liquid stream by adsorption mechanisms. For example, the use of activated alumina is considered to be an economical method for treating water for the removal of a variety of pollutants, gasses, and some liquids. Its highly porous structure allows for preferential adsorption capacity for moisture and contaminants contained in gasses and some liquids. It is useful as a desiccant for gasses and vapors in the petroleum industry, and has also been used as a catalyst or catalyst-carrier in air and in water purification. Removal of contaminants such as phosphates by activated alumina are known in the art. See, for example, Yee, W., "Selective Removal of Mixed Phosphates by Activated Alumina," *J. Amer. Waterworks Assoc.*, Vol. 58, pp. 239–247 (1966).

U.S. Pat. No. 5,242,879 to Abe et al. discloses that activated carbon materials, which have been subjected to carbonization and activation treatments, and then further subjected to an acid treatment and a heat treatment in an atmosphere comprising an inert gas or a reducing gas, have a high catalytic activity and are suitable as catalysts for the decomposition of hydrogen peroxide, hydrazines or other water pollutants such as organic acids, quaternary ammonium-salts, and sulfur-containing compounds. Acid is used to remove impurities and not to enhance the adsorbent features.

Ion implantation has been used in integrated circuit fabrication. U.S. Pat. No. 4,843,034 to Herndon et al. discloses methods and systems for fabricating interlayer conductive paths in integrated circuits by implanting ions into selected regions of normally insulative layers to change the composition and/or structure of the insulation in the selected regions. It is stated that a wide range of insulative materials can be rendered selectively conductive, including polymeric insulators and inorganic insulators, such as metal or semiconductor oxides, nitrides or carbides. Insulators which can be processed according to this patent include silicone dioxide, silicon nitride, silicon carbide, aluminum oxides, and others. It is disclosed that implanted ions can include ions of silicon, germanium, carbon, boron, arsenic, phosphorous, titanium, molybdenum, aluminum, and gold. Typically, the implantation energy varies from about 10 to about 500 KeV. It is disclosed that the ion implantation step changes the composition and structure of the insulative layer and is believed also to have the effect of displacing oxygen, nitrogen, or carbon so as to promote the migration and alloying of metal from the conductive layer(s) into the implanted region during the sintering step. The implantation also is believed to have the physical effect of disrupting the crystal lattice, which may also facilitate the fusion of the metal. This results in a composite material in the implantation region essentially consisting of the disruptive (disrupted) insulator and implanted ions. In the working examples, ions of silicon were implanted into the particular region of the silicon dioxide layer using a direct implantation machine.

U.S. Pat. No. 5,218,179 to Matossian et al. discloses a plasma source arrangement for providing ions for implantation into an object. A large scale object which is to be implanted with ions is enclosed in a container. The plasma is generated in a chamber which is separate from, and opens into the container for a plasma source ion implantation working volume. The plasma diffuses from the chamber into the container to surround the object with substantially improved density compared to conventional practice. High voltage negative pulses are applied to the object, causing the ions to be accelerated from the plasma toward and be implanted into the object.

Thus, there has been a need in the art for adsorbents that have improved ability to adsorb particular materials, especially contaminants from a gas or liquid stream, to thereby purify the stream. Also, there has been a need in the art for catalysts that have the ability or that have an improved ability to catalyze the reaction of contaminants into non-hazardous products.

Additionally, there has been a need in the art for adequately agglomerating adsorbent particles together to form a composite particle for performing simultaneous multiple adsorptions and purifications. Prior art particles typically mask at least some of the adsorbent or catalytic sites on the particles, thus reducing the efficiency or performance of the particles.

In the present invention, none of the above-cited documents discloses compounds, compositions or processes such as those described and claimed herein.

SUMMARY OF THE INVENTION

In accordance with the purpose(s) of this invention, as embodied and broadly described herein, this invention, in one aspect, relates to a method for producing an enhanced adsorbent and/or enhanced catalytic particle and/or for producing a catalytic particle, comprising the steps of:

(a) removing an effective amount of air from a closed chamber containing an adsorbent and/or catalytic particle, wherein the resultant chamber pressure is less than one atmosphere;

(b) raising the chamber pressure with an inert gas to at least one atmosphere;

(c) contacting the particle with an energy beam of sufficient energy for a sufficient time to thereby enhance the adsorbent and/or catalytic properties of the particle and/or produce catalytic properties in the particle.

The particle produced from this process can catalytically decompose particular contaminants, even at room temperature.

The invention further provides a method for producing an enhanced adsorbent and/or enhanced catalytic particle and/or for producing a catalytic particle, comprising implanting oxygen into an adsorbent and/or catalytic particle.

In yet another aspect, the invention relates to the particle made by the process of the invention.

In yet another aspect, the invention relates to an enhanced adsorbent and/or enhanced catalytic particle and/or a catalytic particle comprising an adsorbent particle that has been treated to provide an excess of oxygen implanted at least on the surface of the particle to thereby form an enhanced adsorbent and/or enhanced catalytic particle and/or a catalytic particle.

In yet another aspect, the invention relates to a binder for binding adsorbent and/or catalytic particles to produce an agglomerated particle comprising colloidal aluminum oxide and an acid.

In yet another aspect, the invention relates to a method for binding adsorbent and/or catalytic particles, comprising the steps of:

(a) mixing colloidal aluminum oxide with the particles and an acid;

(b) agitating the mixture to homogeneity; and (c) heating the mixture for a sufficient time to cause cross-linking of the aluminum oxide in the mixture.

In yet another aspect, the invention relates to a method for reducing or eliminating the amount of a contaminant from a liquid or gas stream comprising contacting the particle of the invention with the contaminant in the stream for a sufficient time to reduce or eliminate the amount of the contaminant from the stream.

In yet another aspect, the invention relates to a method for adsorbing a contaminant from a liquid or gas stream onto an adsorbent particle comprising contacting the particle of the invention with the contaminant in the stream for a sufficient time to adsorb the contaminant.

In yet another aspect, the invention relates to a method for catalyzing the degradation of a hydrocarbon comprising contacting the hydrocarbon with the particle of the invention for a sufficient time to catalyze the degradation of the hydrocarbon.

In yet another aspect, the invention relates to a method for reducing or eliminating the amount of a contaminant from a gas stream by catalysis comprising contacting the particle of the invention with a gas stream containing a contaminant comprising an oxide of nitrogen, an oxide of sulfur, carbon monoxide, or mixtures thereof for a sufficient time to reduce or eliminate the contaminant amount.

In yet another aspect, the invention relates to an apparatus for producing an enhanced adsorbent and/or enhanced catalytic particle and/or for producing a catalytic particle comprising:

(a) chamber means for containing the particle in a closed system having an inlet gas port, an exit gas port, and a target plate, said chamber means being capable of maintaining vacuum and positive pressures;

(b) means for providing an inert gas to the chamber means through the inlet gas port;

(c) means for withdrawing from the chamber means an effective amount of the ambient air therein so as to create a vacuum within the chamber means; and (d) means for providing an energy beam to the chamber means, said energy beam means outlet being targeted at the target plate.

In yet another aspect, the invention relates to a method for increasing the surface area of an adsorbent and/or catalytic particle, comprising the steps of (a) raising the chamber gauge pressure of a closed chamber containing the adsorbent and/or catalytic particle to at least 100 psi with an inert gas and (b) rapidly reducing the chamber pressure to thereby increase the surface area of the particle.

In yet another aspect, the invention relates to a method for producing an enhanced adsorbent and/or enhanced catalytic particle and/or for producing a catalytic particle, comprising the step of (a) contacting an adsorbent and/or catalytic particle with an energy beam of sufficient energy for a sufficient time to thereby enhance the adsorbent and/or catalytic properties of the particle and/or produce catalytic properties in the particle.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE PREFERRED EMBODIMENTS

Figure 1:
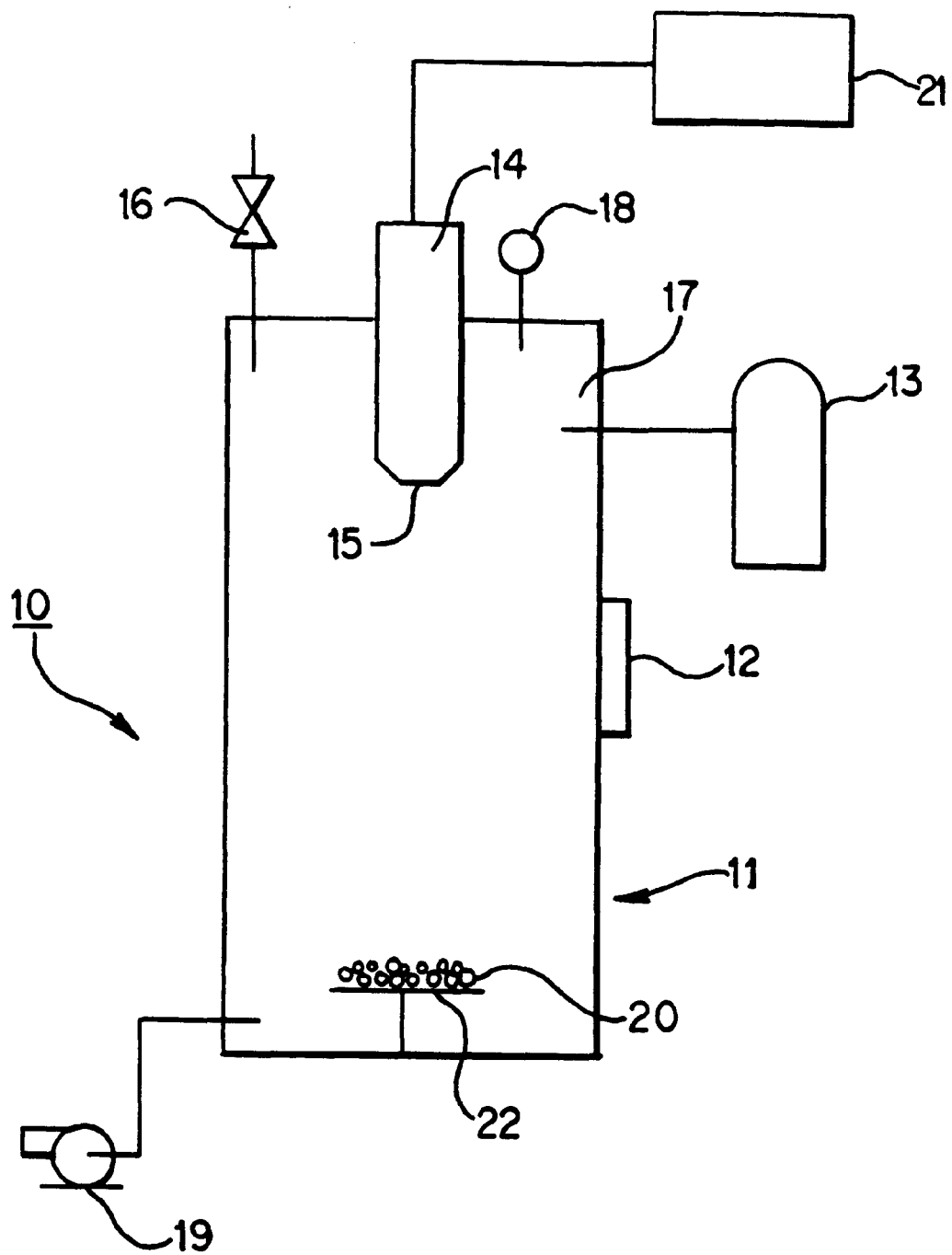
FIG. 1 shows an apparatus of one embodiment of the present invention for producing an enhanced adsorbent and/or enhanced catalytic particle and/or for producing a catalytic particle.

The present invention may be understood more readily by reference to the following detailed description of preferred embodiments of the invention and the Examples included therein and to the Figures and their previous and following description.

Before the present compositions of matter, methods, and apparatuses are disclosed and described, it is to be understood that this invention is not limited to specific synthetic methods, to particular formulations, or to particular apparatuses, as such may, of course, vary. It is also to be understood that the terminology used herein is for the purpose of describing particular embodiments only and is not intended to be limiting.

It must be noted that, as used in the specification and the appended claims, the singular forms "a," "an" and "the" include plural referents unless the context clearly dictates otherwise.

In this specification and in the claims which follow, reference will be made to a number of terms which shall be defined to have the following meanings:

"Optional" or "optionally" means that the subsequently described event or circumstance may or may not occur, and that the description includes instances where said event or circumstance occurs and instances where it does not.

The term "particle" as used herein is used interchangeably throughout to mean a particle in the singular sense or a combination of smaller particles that are grouped together into a larger particle, such as an agglomeration of particles.

The term "ppm" refers to parts per million and the term "ppb" refers to parts per billion. GPM is gallons per minute.

In accordance with the purpose(s) of this invention, as embodied and broadly described herein, this invention, in one aspect, relates to a method for producing an enhanced adsorbent and/or enhanced catalytic particle and/or for producing a catalytic particle, comprising the steps of:
   (a) removing an effective amount of air from a closed chamber containing an adsorbent and/or catalytic particle, wherein the resultant chamber pressure is less than one atmosphere;
   (b) raising the chamber pressure with an inert gas to at least one atmosphere;
   (c) contacting the particle with an energy beam of sufficient energy for a sufficient time to thereby enhance the adsorbent and/or catalytic properties of the particle and/or produce catalytic properties in the particle.

The particle produced from this process can catalytically decompose particular contaminants at room temperature.

The invention further provides a method for producing an enhanced adsorbent and/or enhanced catalytic particle and/or for producing a catalytic particle, comprising implanting oxygen into an adsorbent and/or catalytic particle.

In yet another aspect, the invention relates to the particle made by the process of the invention.

In yet another aspect, the invention relates to an enhanced adsorbent and/or enhanced catalytic particle and/or a catalytic particle comprising an adsorbent particle that has been treated to provide an excess of oxygen implanted at least on the surface of the particle to thereby form an enhanced adsorbent and/or enhanced catalytic particle and/or a catalytic particle.

In yet another aspect, the invention relates to a binder for binding adsorbent and/or catalytic particles to produce an agglomerated particle comprising colloidal aluminum oxide and an acid.

In yet another aspect, the invention relates to a method for binding adsorbent and/or catalytic particles, comprising the steps of:
   (a) mixing colloidal aluminum oxide with the particles and an acid;
   (b) agitating the mixture to homogeneity; and
   (c) heating the mixture for a sufficient time to cause cross-linking of the aluminum oxide in the mixture.

In yet another aspect, the invention relates to a method for reducing or eliminating the amount of a contaminant from a liquid or gas stream comprising contacting the particle of the invention with the contaminant in the stream for a sufficient time to reduce or eliminate the amount of the contaminant from the stream.

In yet another aspect, the invention relates to a method for adsorbing a contaminant from a liquid or gas stream onto an adsorbent particle comprising contacting the particle of the invention with the contaminant in the stream for a sufficient time to adsorb the contaminant.

In yet another aspect, the invention relates to a method for catalyzing the degradation of a hydrocarbon comprising contacting the hydrocarbon with the particle of the invention for a sufficient time to catalyze the degradation of the hydrocarbon.

In yet another aspect, the invention relates to a method for reducing or eliminating the amount of a contaminant from a gas stream by catalysis comprising contacting the particle of the invention with a gas stream containing a contaminant comprising an oxide of nitrogen, an oxide of sulfur, carbon monoxide, or mixtures thereof for a sufficient time to reduce or eliminate the contaminant amount.

In yet another aspect, the invention relates to an apparatus for producing an enhanced adsorbent and/or enhanced catalytic particle and/or for producing a catalytic particle comprising:
   (a) chamber means for containing the particle in a closed system having an inlet gas port, an exit gas port, and a target plate, said chamber means being capable of maintaining vacuum and positive pressures;
   (b) means for providing an inert gas to the chamber means through the inlet gas port;
   (c) means for withdrawing from the chamber means an effective amount of the ambient air therein so as to create a vacuum within the chamber means; and
   (d) means for providing an energy beam to the chamber means, said energy beam means outlet being targeted at the target plate.

In yet another aspect, the invention relates to a method for increasing the surface area of an adsorbent and/or catalytic particle, comprising the steps of
   (a) raising the chamber gauge pressure of a closed chamber containing the adsorbent and/or catalytic particle to at least 100 psi with an inert gas and
   (b) rapidly decompressing the chamber pressure to thereby increase the surface area of the particle.

In yet another aspect, the invention relates to a method for producing an enhanced adsorbent and/or enhanced catalytic particle and/or for producing a catalytic particle, comprising the step of:
   (a) contacting an adsorbent and/or catalytic particle with an energy beam of sufficient energy for a sufficient time to thereby enhance the adsorbent and/or catalytic properties of the particle and/or produce catalytic properties in the particle.

By enhanced adsorbent and/or enhanced catalytic particle, it is understood that the particles of this invention have improved adsorbent and/or improved catalytic properties over prior art adsorbent and/or catalytic particles. Also, by producing a catalytic particle, it is understood that some particles of the instant invention have catalytic properties for catalyzing the conversion of particular contaminants into other forms, whereas the same particles not treated by the process of the present invention possess no catalytic properties at least for those particular contaminants.

Enhanced adsorptive properties is intended to include both ion capture and ion exchange mechanisms. Ion capture refers to the ability of the particle to irreversibly bond to other atoms through ionic or covalent interactions. Ion exchange is well known in the art and refers to ions being interchanged from one substance to another. Adsorption is a term well known in the art and should be distinguished from absorption.

In the particle of this invention, typically any particle that initially has some adsorbent and/or catalytic properties can be used. For example, activated carbon and oxide particles can be oxygen implanted by the process of the present invention.

The invention contemplates the use of any prior art adsorbent and/or catalyst particle or composite particle of two or more types of particles. In a preferred embodiment, the particle comprises an oxide particle, preferably a metal oxide particle, and even more preferably a non-ceramic, porous metal oxide particle. Examples of such particles include, but are not limited to, oxide complexes, such as transition metal oxides, lanthanide oxides, thorium oxide, as well as oxides of Group IIA (Mg, Ca, Sr, Ba), Group IIIA (B, Al, Ga, In, Tl), Group IVA (Si, Ge, Sn, Pb), and Group VA (As, Sb, Bi). In another embodiment, the particle comprises an oxide of aluminum, titanium, copper, vanadium, silicon, manganese, iron, zinc, zirconium, tungsten, rhenium, arsenic, magnesium, thorium, silver, cadmium, tin, lead, antimony, ruthenium, osmium, cobalt or nickel or zeolite. Typically, any oxidation state of the oxide complexes may be useful for the present invention. The oxide can be a mixture of at least two metal oxide particles having the same metal with varying stoichiometry and oxidation states. In one embodiment, the particle comprises $Al_2O_3$, $TiO_2$, $CuO$, $Cu_2O$, $V_2O_5$, $SiO_2$ $MnO_2$, $Mn_2O_3$, $Mn_3O_4$, $ZnO$, $WO_2$, $WO_3$, $Re_2O_7$, $As_2O_3$, $As_2O_5$, $MgO$, $ThO_2$, $Ag_2O$, $AgO$, $CdO$, $SnO_2$, $PbO$, $FeO$, $Fe_2O_3$, $Fe_3O_4$, $Ru_2O_3$, $RuO$, $OSO_4$, $Sb_2O_3$, $CoO$, $Co_2O_3$, $NiO$ or zeolite. In a further embodiment, the particle further comprises a second type of adsorbent and/or catalyst particles of an oxide of aluminum, titanium, copper, vanadium silicon, manganese, iron, zinc, zirconium, tungsten, rhenium, arsenic, magnesium, thorium, silver, cadmium, tin, lead, antimony, ruthenium, osmium, cobalt or nickel or zeolite, activated carbon, including coal and coconut carbon, peat, zinc or tin. In another embodiment, the particle further comprises a second type of adsorbent and/or catalyst particles of aluminum oxide, titanium dioxide, copper oxide, vanadium pentoxide, silicon dioxide, manganese dioxide, iron oxide, zinc oxide, zeolite, activated carbon, peat, zinc or tin particle. In a preferred embodiment, the particle comprises non-amorphous, non-ceramic, crystalline, porous, calcined aluminum oxide that was produced by calcining the precursor to the calcined aluminum oxide at a particle temperature of from 400° C. to 700° C., preferably in the gamma, chi-rho, or eta form. The precursor to calcined aluminum oxide can include but is not limited to boehmite, bauxite, pseudo-boehmite, scale, $Al(OH)_3$ and alumina hydrates. In the case of other metal oxide complexes, these complexes can also be calcined or uncalcined.

In another embodiment, for oxide particles, oxides of metals or oxides of non-metals, such as silicon or germanium, are preferred. Even more preferred are oxides of transition metals, oxides of metals of Group III (B, Al, Ga, In, Tl) and IA (Li, Na, K, Rb, Cs, Fr) of the periodic table, and oxides of silicon. Even more preferred are oxides of aluminum, titanium, copper, vanadium, silicon, manganese, iron, zinc, titanium and zeolite. Particularly preferred oxides include aluminum oxide ($Al_2O_3$), silicon dioxide ($SiO_2$), manganese dioxide ($MnO_2$), copper oxide (CuO), iron oxide black ($Fe_3O_4$), iron oxide red (ferric oxide or $Fe_2O_3$), zinc oxide (ZnO), zirconium oxide ($ZrO_2$), vanadium pentoxide ($V_2O_5$), titanium dioxide ($TiO_2$) and zeolite. Typical zeolites used in the present invention include "Y" type, "beta" type, mordenite, and ZsM5.

In one embodiment, the particle comprises aluminum oxide that has been pre-treated by a calcination process. Calcined aluminum oxide particles are well known in the art. They are particles that have been heated to a particular temperature to form a particular crystalline structure. Processes for making calcined aluminum oxide particles are well known in the art as disclosed in, e.g., *Physical and Chemical Aspects of Adsorbents and Catalysts,* ed. Linsen et al., Academic Press (1970), which is incorporated by reference herein. In one embodiment, the Bayer process can be used to make aluminum oxide precursors. Also, pre-calcined aluminum oxide, that is, the aluminum oxide precursor ($Al(OH)_3$), and calcined aluminum oxide are readily commercially available. Calcined aluminum oxide can be used in this dried form or can be used in a partially or near fully deactivated form by allowing water to be adsorbed onto the surface of the particle.

In a preferred embodiment, the aluminum oxide has been produced by calcining at a temperature of from 400° C. to 700° C. These calcined aluminum oxide particles are preferably in the gamma, chi-rho, or eta forms and have a pore size of from 3.5 nm to 35 nm diameter and a BET surface area of from 120 to 350 $m^2/g$.

For activated carbon, any of the activated carbons useful in the adsorbent art can be used. Preferably coal based carbon or coconut based carbon are used. Generally, coal based carbon can be used to remediate aqueous contaminants while coconut based carbon can be used to remediate airborne or gaseous contaminants. Preferably, the activated carbon is less than 20 microns in size for ease of mixing and extrusion.

The particle of the invention can be used alone, in combination with identical or different type composition particles prepared by the processes of the invention, and/or in combination with other adsorbent or catalytic particles known in the art. The particles can be combined in a physical mixture or agglomerated using techniques known in the art or disclosed herein. In a preferred embodiment, different composition type particles are combined by agglomeration to form a multifunctional composite particle. In this embodiment, particles can be used to achieve multiple functions simultaneously, such as by removing multiple contaminants, by taking advantage of the individual effects from each of the types of particles. Co-particles that are preferably used in this invention include all particles previously disclosed and zeolite. The quantity and proportions of each component vary depending on the contaminant being remediated.

In one embodiment, the composite particle comprises aluminum oxide and a second particle of titanium dioxide, copper oxide, vanadium pentoxide, silicon dioxide, manganese dioxide, iron oxide, zinc oxide, activated carbon, or zeolite. In another embodiment, the composite particle comprises aluminum oxide and activated carbon. In another embodiment, the particle comprises activated carbon (coal-based), activated carbon (coconut-based), silicon dioxide, and aluminum oxide. In a preferred embodiment, this particle is used to remediate aqueous contamination. In one embodiment, this particle of coal-based activated carbon, coconut-based activated carbon, silicon dioxide, and aluminum oxide is used to remediate aqueous contaminants, such as 1,2-dibromo-3-chloropropane (DBCP), radon, and heavy metals, from a contaminated water source.

The particles of this invention can be subjected to other treatments prior to or after being treated by the process of the present invention. The particles of the invention can be pretreated by processes known in the art to improve their adsorptive capability, such as by calcination. Calcination refers to heating a solid to a temperature below its melting point to alter the crystal structure to a particular form. The calcined particle can be dried or maintained in dry form creating an activated particle or, if water is absorbed on the particle, the particle can be partially or near fully deactivated.

The adsorbent, catalyst, and adsorbent and catalyst particles used in this invention can be additionally enhanced by other processes, such as, for example, the particles can be dried to be activated or can be treated by processes disclosed in the prior filed parent applications of and in applicants' copending application filed on the same date as this application and entitled "Acid Contacted Enhanced Adsorbent Particle and Method of Making and Using Therefor," which is a continuation-in-part of U.S. application Ser. No. 08/662,331, filed Jun. 12, 1996, pending, which is a continuation-in-part of PCT/US95/15829, filed Jun. 12, 1995, pending, which is a continuation-in-part of U.S. application serial No. 08/351,600, filed Dec. 7, 1994, abandoned, the disclosures of the above application filed on the same date as this application and all of its prior filed priority applications are herein incorporated by this reference in their entireties for all of their teachings.

In one embodiment, the particles of this invention can be in dry, slurry, or gel form. The particle size can vary depending on the end use, ranging in sizes known in the art, such as colloidal, microscopic, or macroscopic. Preferably, the particles prior to agglomeration are less than 20 microns in size for ease of mixing and extrusion. The particle size after agglomeration can vary depending on the application. In large columns, the particle size can be as large as one inch in diameter. The size range is typically from 200 microns to 3000 microns, preferably from 500 microns to 1500 microns.

Binders for binding the individual particles to form an agglomerated particle are known in the art or are described herein. In a preferred embodiment, the binder can also act as an adsorbent and/or a catalyst. Preferred binders are disclosed in applicants' application filed on the same date as this application entitled "Adsorbent and/or Catalyst and Binder System and Method of Making and Using Therefor," the disclosure of which is is herein incorporated by this reference in its entirety for all of its teachings.

A preferred binder for the agglomerated particle is colloidal alumina or colloidal silica. The colloidal aluminum oxide goes through a transformation stage and cross-links with itself from 25° C. to 400° C., preferably 250° C. and/or can cross-link with the particle. Colloidal silicon dioxide cross-links with itself if it is sufficiently dried to remove water typically at temperatures of from 25° C. to 400° C. Preferably, from about 1 to 99.9 by weight, or 20% to 99% by weight, of the total mixture is colloidal aluminum oxide or colloidal silicon dioxide to provide the necessary crosslinking during heating to bind the agglomerated particle into a water-resistant particle. The particle can then withstand exposure to all types of water for an extended time and not disintegrate.

The binder can be mixed with the particle before or after the ion or electron energy treatment of this inventiont. In one embodiment, the agglomerated particle is made by mixing colloidal aluminum oxide with the adsorbent particles. Typically, from about 1 to about 99.9% by weight, or from 20 to 99% by weight of the mixture is colloidal aluminum oxide. The particle mixture is then mixed with an acid solution such as, for example, nitric, sulfuric, hydrochloric, boric, acetic, formic, phosphoric, and mixtures thereof In one embodiment the acid is 5% nitric acid solution. The colloidal aluminum oxide, adsorbent and/or catalytic particles, and acid solution are thoroughly mixed so as to create a homogenous blend of all elements. Then additional acid solution is added and further mixing is performed until the mixture reaches a suitable consistency for agglomeration. After agglomeration is complete, the agglomerated particles are heated to cause the colloidal aluminum oxide crosslinking to occur.

Sources and/or methods of making the starting materials for the various adsorbent particles of the present invention are readily available and are well-known to those of ordinary skill in the art.

For an explanation of the process used to make a particle of one embodiment of this invention, reference is made to FIG. 1. The apparatus of this embodiment is designated generally as 10. The particulate material or target media 20 to be treated is placed in a chamber 11 on an ungrounded target plate 22. In one embodiment, the target plate can be rotated to provide more efficient treatment of the particle by the energy beam. Chamber 11 is preferably made of a dielectric material. Chamber 11 is sealed by a compression plate latched door 12 that has the ability to withstand pressure differentials ratios both in the positive as well as negative pressures. Pressure is monitored with pressure gauge 18. Vacuum conditions are created in the chamber using vacuum pump 19 to evacuate an effective amount of air initially contained in the chamber. Air can be detrimental to the oxygen implantation step in that it reduces the efficiency of the energy beam's effect on the particle. Evacuating an effective amount of air is intended to mean that enough air is removed so that the energy beam has the ability to enhance the adsorbent and/or catalytic properties and/or produce catalytic properties in the particle. Typically, vacuum pump 19 is used to evacuate as much air as possible from chamber 11 to maximize the energy beam's efficiency and to allow a beam of lower energy to be used. In one embodiment, the vacuum pressure is from 0.1 to 5 millitorr, preferably from 1 to 2.5 millitorr. The evacuation time is typically from 1 seconds to 4 hours, preferably 30 seconds to 5 minutes. The chamber is brought up to a pressure of at least atmospheric pressure using an inert gas from cylinder 13 through a high pressure injector 17. In one embodiment, the gauge pressure (pressure above atmospheric) is from 1 to 5,000 psi. Typically, the gauge pressure can be at least about 20 psi to prevent arcing.

The inert gas is typically any gas that is inert to chemically reacting with and degrading the adsorbent and/or catayst particle, and yet, does not impede the energy beam's effectiveness in implanting the oxygen. Typical inert gases include the noble gases, such as helium, neon, argon, krypton, xenon, and radon.

The energy source is targeted at the particle contained in the chamber through an energy injector 15 located at the end of the energy source 14. The energy source can be of high enough energy that can force oxygen into the particle and/or add excess charge to the particle. Typically, the energy source is an ion machine which concentrates an ion or electron beam, such as a broad beam ion source or a wide beam photoionizer. The energy source (ion beam or electron beam) can has an energy range of preferably from 1 to 100 eV, more preferably from 10 to 50 eV, even more preferably 15 to 20 eV. In a specific embodiment, the energy source can be a broad beam ion source, manufactured by Commonwealth Scientific Corp., Alexandria, Va., U.S.A. This is described in the publication, Kaufman et al., "Characteristics, Capabilities, and Applications of Broad-Beam Sources," Commonwealth Scientific Corporation, Alexandria Va., USA, 1987, which is herein incorporated by reference for all of its teachings and specifically for a description of the broad beam ion source. The energy source 14, utilizes a power supply 21. In a specific embodiment, the power supply can be a Commonwealth IBS-250 high voltage power supply rated up to 1500V with remote operation capabilities. Additionally, the energy beam causes the inert gas to become ionized. The charge introduced into the chamber is at a level sufficient to enhance the adsorbent and/or catalytic properties of the particle and/or produce catalytic properties in the particle. In one embodiment, an electron beam of 15 to 20 eV was used, although a smaller or larger amount of energy can be used. Once the proper charge has been attained for a sufficient time, the energy source is turned off This sufficient time can be very short, on the order of less than a second to about 10 seconds, although a longer time is not detrimental. Then, the chamber pressure is reduced via a release valve 16.

The present invention should be distinguished from the use of different, particularly higher, energy levels of the ion or electron beam. As described above, the penetration of ions and other substituents underneath the surface of the particle is typically achieved at energy levels ranging from from 1 to 100 eV. If the energy level is raised, other manipulations outside the scope of this invention are performed. For example, in ion-beam etching, the beam is directed toward a surface, with the objective of removing material from that surface. Etching is also referred to as physical sputtering, a term that is known to one skilled in the art. The maximum removal of material by physical sputtering is usually obtained in the energy range of 300–500 eV. The present invention should also be distinguished over uses of different types of energy sources or the non-targeting of the particle by the energy source, such as particularly gamma radiation, x-rays, electromagnetic radiation, electric fields, and lasers, and non-targeted plasma fields.

Not wishing to be bound by theory, it is theorized that the energy beam causes oxygen, believed to be atomic and/or diatomic oxygen, present on the surface of the particle to be pushed below the surface of the particle, which then becomes tightly bound to the internal structure of the particle. In particular, ions of the inert gas generated by the ion or electron beam collide against the particle, and it is the momentum of these ions that force oxygen to penetrate the surface of the particle. For crystalline particles, the oxygen becomes tightly bound within the crystal lattice. The atomic and/or diatomic oxygen originates from oxygen that is on the outer surface of the crystal lattice of the particle or from residual water or air on the surface of the particle. This increases the adsorbent and/or catalytic characteristics of the particle and can create catalytic properties, including room temperature catalytic capabilities, in the particle. The process creates a more active surface by creating surface defects. Surface defects have long been proposed as the active sites in many catalytic reactions.

In another embodiment, in the energy beam process above, after the air has been removed from the chamber, inert gas is added so that the chamber pressure is brought up to a high pressure. Typically, the gauge pressure can be from about at least 100 psi, more preferably at least 1,000 psi, even more preferably at least 5,000 psi. Even higher pressures can be used if the chamber 15 is of a high enough pressure rating. The high pressure or compression is maintained for a sufficient time to increase the density of the particle. Typically, about ten minutes of high pressure is sufficient. After the energy source has been introduced for a sufficient time in the chamber as described above, the energy source is turned off and then the chamber pressure is rapidly lowered via release valve 16. By rapidly, it is preferably meant about 3 seconds. This increases the surface area of the particle.

Not wishing to be bound by theory, it is theorized that as the pressure from the chamber is rapidly released, the contents of the chamber expand simultaneously but at different rates of expansion. The charged inert gas expands at a much faster rate than that of the particulate matter due to the density differences between the two substances. Due to this expansion rate difference, the charged inert gas travels rapidly and penetrates or explodes into and through the particles or inert gas that is trapped within the particle rapidly escapes. This rapid penetration or escape alters the pore structure and increases the amount of pores of the particle. The surface area of the particle is thereby greatly increased, increasing the overall adsorption capability of the particle. Depending on the particle employed, the BET surface area can be increased at least 1%, more preferably at least 5%, even more preferably at least 10%, even more preferably at least 20%, even more preferably at least 30%: The lower density particles, such as activated carbon, can achieve a greater increase in surface area.

The chamber pressure and the energy level can be varied to produce different effects to meet the particular physical and chemical requirements for the specific particle end use. Varying the pressure and energy level parameters can alter the ability of the particle to adsorb or degrade a particular contaminant.

In another embodiment of this invention, the surface area enhancement aspect of the process can be practiced alone without the energy beam aspect. In this embodiment, the inert gas only needs to be inert to the particle and does not have to be inert to the effects of the energy beam. Thus, gases such as air and $CO_2$ can also be used in the this embodiment.

In another embodiment, the energy beam aspect can be practiced alone without the surface area enhancement aspect. In this embodiment, the energy beam is targeted directly at the particle to implant oxygen within the particle. This can be done in the batch process described above or a semi-batch or continuous process. In a semi-batch process, particles are automatically moved into the chamber where they are treated and automatically removed from the chamber. In a continuous process, in one embodiment, the particles are provided on a conveyor belt system. Air is displaced from the area around the particles by inert gas to provide a viable path for the energy beam, which is set up along side or overhead of the conveyer belt system. The energy beam is either continuously on or is turned on as the particles reach a specific point along the conveyer belt system. In a variation of the embodiments of this invention, the air removal and replacement with inert gas steps in the batch or semi-batch processes and the air displacement by inert gas step in the continuous process can be avoided by using a high or extremely high level of output energy source, such that, the air does not impede the oxygen from penetrating the surface of the particle while maintaining a low enough energy on the particle, such as from 1 ot 100 eV, so that etching and sputtering does not occur. In another embodiment of a continuous process, the particles are filtered through a mesh screen sieve, which has been substantially ionized to cause the oxygen on the particle to penetrate the particle.

The particles of this invention are characterized by having an increased level of oxygen at least on the surface of the particle. This increased level of oxygen is higher than the total of the stoichiometric amount of oxygen expected in the particle and that found as residual oxygen on the surface of the particle. The oxygen implanted particle has at least 1.1 times the oxygen atom per cent to non-oxygen atom per cent ratio at its surface compared to the initial non-oxygen implanted particle, wherein the surface characterization is determined by an x-ray photoelectron spectroscopy (XPS or ESCA) spectrometer, a device well known to those of skill in the art. Even more preferably, the particle has at least a 1.5 fold increase in oxygen ratio, even more preferably the particle has at least a 2 fold increase in oxygen ratio, even more preferably, at least a 4 fold increase in oxygen ratio, even more preferably at least a 6 fold increase in oxygen ratio.

The particle of this invention can be used in any adsorption and/or catalytic application known to those of ordinary skill in the art to achieve superior results over prior art particles. Additionally, the particle of the invention can be used in various adsorption and/or catalytic applications never before contemplated in the art. In one embodiment, the particle is used for environmental remediation applications. In this embodiment, the particle can be used to remove contaminants, such as heavy metals, organic compounds, including for example but not limited to, chlorinated organic compounds and volatile organic compounds, inorganic compounds, or mixtures thereof. Specific examples of contaminants include, but are not limited to, acetone, microbials, ammonia, benzene, carbon monoxide, chlorine, dioxane, ethanol, ethylene, formaldehyde, hydrogen cyanide, hydrogen sulfide, methanol, trichloroethylene, methyl ethyl ketone, methylene chloride, nitrogen oxides, propylene, styrene, sulfur dioxide, toluene, vinyl chloride, arsenic, lead, iron, phosphates, selenium, cadmium, uranium, plutonium, radon, 1,2-dibromo-3-chloropropane (DBCP), chromium, tobacco smoke, and cooking fumes. The particle of this invention can remediate individual contaminants or multiple contaminants from a single source.

For environmental remediation applications, typically, particles of the invention are placed in a container, such as a filtration unit. The contaminated stream enters the container at one end, contacts the particles within the container, and the purified stream exits through another end of the container. The flow rate of the contaminant stream and the amount of particle material needed can be determined by one of skill in the art with routine experimentation by determining the capacity needed. The particles contact the contaminants within the stream and bond to and remove the contamination from the stream. The particles can also eliminate certain contaminants by catalyzing the conversion of the contaminants into other components. Typically, in the adsorption application, the particles become saturated with contaminants over a period of time, and the particles must be removed from the container and replaced with fresh particles. The contaminant stream can be a gas, such as air, or liquid, such as water.

The particle of this invention bonds with the contaminant so that the particle and contaminant are tightly bound. This bonding makes it difficult to remove the contaminant from the particle, allowing the waste product to be disposed of into any public landfill. Measurements of contaminants adsorbed on the particles of this invention using a Toxicity Characteristic Leachability Procedure (TCLP) test known to those of skill in the art showed that there was a very strong interaction between the particles of this invention and the contaminants such that the contaminant can be held very tightly.

The particles of this invention have superior ability to adsorb contaminants due to enhanced physical and chemical properties of the particle. The particles of this invention can adsorb a larger amount of adsorbate per unit volume or weight of adsorbent particles than a non-enhanced particle. The particle of this invention surprisingly removes contaminants in various streams at both high and low concentrations of contaminants. Also, the particles of this invention can reduce the concentration of contaminants or adsorbate material in a stream to a lower absolute value than is possible with a non-enhanced particle. In particular embodiments, the particles of this invention can reduce the contaminant concentration in a stream to below detectable levels, believed to be never before achievable with prior art particles.

The particles of this invention can also have a newly added catalytic property. Specifically, the increased oxygen content in the particle matrix allows the particle to act as a catalyst. For example, the particle has the ability to catalyze the break down of organics, such as hydrocarbon compounds or substituted hydrocarbons and has the ability to catalyze the conversion of CO, $SO_x$, or $NO_x$ into other components, even at low heat or room temperatures.

Particular end uses contemplated for this invention include, but are not limited to, reducing or eliminating contaminants for particular applications, such as waste water treatment facilities, sewage facilities, municipal water purification facilities, in-home water purification systems, smoke stack effluents, vehicle exhaust effluents, engine or motor effluents, home or building air purification systems, home radon remediations, landfill leachates, manufacturing facility chemical waste effluents, and the like.

Prior art adsorbents, such as activated carbon, when sprayed with anti-microbials, tend to lose their adsorbent properties. Conversely, the increased adsorbent properties allow the particles of the present invention to be sprayed with anti-microbials while still retaining the particle's adsorbent properties.

A preferred binder that can be used with the particles of this invention is a colloidal metal oxide or colloidal metalloid oxide binder as disclosed in applicants copending application filed on the same date as this application and entitled "Adsorbent and/or Catalyst and Binder System and Method of Making and Using Therefor," which is (1) a continuation-in-part of PCT/US96/05303, filed Apr. 17, 1996, pending, which is a continuation-in-part of U.S. application Ser. No. 08/426,981, filed Apr. 21, 1995, pending; (2) a continuation-in-part of U.S. application Ser. No. 08/426,981, filed Apr. 21, 1995, pending; (3) a continuation-in-part of U.S. application Ser. No. 08/662,33 1, filed Jun. 12, 1996, pending, which is a continuation-in-part of PCT/US95/15829, filed Jun. 12, 1995, pending, which is a continuation-in-part of U.S. application Ser. No. 08/351,600, filed Dec. 7, 1994, abandoned; and (4) a continuation-in-part of PCT/US95/15829, filed June 12, 1995, pending, which is a continuation-in-part of U.S. application Ser. No. 08/351,600, filed Dec. 7, 1994, abandoned. All of the above applications are hereby incorporated by this reference in their entireties for all of their teachings. Additionally, this binder can be used with an untreated (non-ion or electon beam enhanced) particle of this invention and/or a treated particle of this invention. This binder can be used on any of the particle compositions referred to above or below of this invention, whether ion or electron beam enhanced or not.

These various embodiments of the invention are described in the copending application filed on even date as follows.

In accordance with the purpose(s) of this invention, as embodied and broadly described herein, this invention, in one aspect, relates to a method for producing an adsorbent and/or catalyst and binder system comprising i) mixing components comprising
    a) a binder comprising a colloidal metal oxide or colloidal metalloid oxide,
    b) an oxide adsorbent and/or catalyst particle, and
    c) an acid,
ii) removing a sufficient amount of water from the mixture to cross-link components a and b to form an adsorbent and/or catalyst and binder system.

In another aspect, the invention provides for an adsorbent and/or catalyst system made by the processes of the invention.

In one aspect, the invention provides an adsorbent and/or catalyst and binder system comprising a binder that has been cross-linked with at least one type of oxide adsorbent and/or catalyst particle.

In yet another aspect, the invention provides a method for reducing or eliminating the amount of a contaminant from a liquid or gas stream comprising contacting the adsorbent and/or catalyst binder system with the contaminant in the stream for a sufficient time to reduce or eliminate the amount of contaminant from the stream.

In yet another aspect, the invention provides a method for catalyzing the degradation of an organic compound comprising contacting the organic compound with the adsorbent and/or catalyst system for a sufficient time to catalyze the degradation of an organic compound.

In yet another aspect, the invention provides a method for reducing or eliminating the amount of a contaminant from a gas stream by catalysis comprising contacting the adsorbent and/or catalyst binder system with a gas stream containing a contaminant comprising an oxide of nitrogen, an oxide of sulfur, carbon monoxide, hydrogen sulfide, or mixtures thereof for a sufficient time to reduce or eliminate the contaminant amount.

In yet another aspect, the invention provides a method for producing an adsorbent and/or catalyst and binder system comprising
i) mixing components comprising
  a) a binder comprising a colloidal metal oxide or colloidal metalloid oxide,
  b) a first adsorbent and/or catalyst particle that does not cross4ink with the binder, and
  c) an acid,
ii) removing a sufficient amount of water from the mixture to cross-link component a to itself, thereby entrapping and holding component b within the cross-linked binder, to form an adsorbent and/or catalyst and binder system.

In another aspect the invention relates to a composition for binding adsorbent and/or catalytic particles to produce an agglomerated particle comprising (a) a colloidal metal oxide or colloidal metalloid oxide and (b) an acid.

In another aspect the invention relates to a kit for binding adsorbent and/or catalytic particles to produce an agglomerated particle comprising (a) a colloidal metal oxide or colloidal metalloid oxide and (b) an acid.

In yet another aspect, the invention provides a method for binding adsorbent and/or catalytic particles, comprising the steps of:
  (a) mixing colloidal alumina or colloidal silica with the particles and an acid;
  (b) agitating the mixture to homogeneity; and
  (c) heating the mixture for a sufficient time to cause cross-linking of the aluminum oxide in the mixture.

When the system acts as an adsorbent, the adsorbent and binder system of this invention has improved or enhanced adsorptive features. In one embodiment, the system of this invention can adsorb a larger amount of adsorbate per unit volume or weight of adsorbent particles than a prior art system. In another embodiment, the adsorbent and binder system of this invention can reduce the concentration of contaminants or adsorbate material in a stream to a lower absolute value than is possible with a non-bound or prior art-bound particle. In particular embodiments, the adsorbent and binder system of this invention can reduce the contaminant concentration in a stream to below detectable levels. Adsorption is a term well known in the art and should be distinguished from absorption. The adsorbent particles of this invention chemically bond to and very tightly retain the adsorbate material. These chemical bonds are ionic and/or covalent in nature.

The catalyst and binder system of the invention can also be used for the catalytic decomposition or remediation of contaminants. The catalyst system achieves improved catalytic performance or catalytic properties never seen before for a particular contaminant. The adsorbent and/or catalyst and binder system can be prepared by techniques set forth below to form a multifunctional composite particle. The catalysis can be at room temperature for certain applications.

The binder comprises an oxide particle that can react, preferably cross-link, with the other oxide complexes. This binder can also react, preferably cross-link, with itself. The binder forms cross-links with other oxide complexes upon drying by forming chemical bonds with itself and with other oxides. Under acidic conditions, the binder has a large number of surface hydroxyl groups. In one embodiment, the binder, which is designated as B-OH, cross-links with itself upon the loss of water to generate B-O-B. In addition cross-linking with itself, the binder B-OH can also cross-link with an adsorbent and/or catalyst oxide complex (M-O) or hydroxyl complex (M-OH) to produce B-O-M. The resulting binder system consists of a three dimensional network or matrix wherein the component particles are bound together with B-O-B and B-O-M bonds. The resulting system can be used as an adsorbent and/or catalyst system. The resultant system is sometimes referred to as an agglomerated particle.

"Colloidal metal or metalloid oxide (i.e. colloidal metal oxide or colloidal metalloid oxide) binder" as defined herein means a particle comprising a metal or metalloid mixed hydroxide, hydroxide oxide or oxide particle, such that the weight loss from the colloidal metal or metalloid oxide binder due to loss of water upon ignition is from 1 to 100%, 5 to 99%, 10 to 98%, or 50 to 95% of the theoretical water weight loss on going from the pure metal or metalloid hydroxide to the corresponding pure metal or metalloid oxide. The loss of water on going from the pure metal or metalloid hydroxide to the corresponding pure metal or metalloid oxide (e.g. the conversion of n $M(OH)_x$ to $M_nO_m$ and y $H_2O$ or more specifically from 2 $Al(OH)_3$ to $Al_2O_3$ and 3 $H_2O$) is defined as 100% of the water weight loss. Thus, the weight loss refers to loss of water based on the initial weight of water (not the total initial binder weight). There is a continuum of metal or metalloid hydroxides, hydroxide oxides, and oxides in a typical commercial product, such that, loss or removal of water from the metal or metalloid hydroxides produces the corresponding hydroxide oxides which upon further loss or removal of water give the corresponding metal or metalloid oxides. Through this continuum the loss or removal of water produces M-O-M bonds, where M is a metal or metalloid. The particles of this continuum, except for the pure metal or metalloid oxides, are suitable to serve as colloidal metal or colloidal oxide binders in this invention.

In another embodiment, the binder system involves the use of a binder in combination with a particle with few or no surface hydroxyl groups, such that the particle does not cross-link or only nominally cross-links with the binder. Examples of particles that posses only nominal amounts or that do not posses surface hydroxyl groups include particles of metals, such as, but not limited to tin or zinc, or carbon. In another embodiment, component b does not contain an oxide particle. Metal alloys such as bronze can also be used. In a preferred embodiment, the particle is activated carbon. In this embodiment, the binder cross-links with itself in a manner described above to form a three dimensional network or matrix that physically entraps or holds component b without cross-linking or cross-linking only to a very small degree with component b The resulting binder system can be used as an adsorbent and/or catalyst system.

In another embodiment, the invention is directed to a method for producing an adsorbent and/or catalyst and binder system comprising
  i) mixing components comprising
    a) a binder comprising a colloidal metal oxide or colloidal metalloid oxide,
    b) a first adsorbent and/or catalyst particle that does not cross-link with the binder, and
    c) an acid,
  ii) removing a sufficient amount of water from the mixture to cross-link component a to itself, thereby entrapping and holding component b within the cross-linked binder, to form an adsorbent and/or catalyst and binder system,
further comprising a second adsorbent and/or catalyst particle that cross-links with the binder, thereby cross-linking the binder and the second particle and thereby entrapping and holding the first particle within the cross-linked binder and/or within the cross-linked binder and second particle. In this embodiment, the system comprises a binder and oxide adsorbent and/or catalyst particles that cross-links with the binder as well as particles that have a limited amount of surface hydroxyl groups, which do not cross-link with the binder. In this case, the binder cross links to itself and to the oxide complex particles, and the binder also forms a network or matrix around the particles that have a limited number of surface hydroxyl groups.

Binders that can be used in the present invention are colloidal metal or metalloid oxide complexes. Colloidal as used herein is defined as an oxide group that has a substantial number of hydroxyl groups that can form a dispersion in aqueous media. This is to be distinguished from the other use of the term colloid as used in regard to a size of less than 1 $\mu$m. The binders herein are typically small in size, e.g. less than 150 $\mu$m, but they do not have to be all less than 1 $\mu$m. Typically, the binder is un-calcined to maximize the hydroxyl group availability. Moreover, they must have a substantial number of hydroxyl groups that can form a dispersion in aqueous media, which is not always true of colloid particles merely defined as being less than 1 $\mu$m. Examples of binders include but are not limited to any metal or metalloid oxide complex that has a substantial number of hydroxyl groups that can form a dispersion in aqueous media. In one embodiment, the binder is colloidal alumina, colloidal silica, colloidal metal oxide where the metal is iron, or a mixture thereof, preferably colloidal alumina or colloidal silica. Colloidal alumina can be a powder, sol, gel or aqueous dispersion. Colloidal alumina may be further stabilized with an acid, preferably nitric acid, and even more preferably 3 to 4% nitric acid. In a preferred embodiment, the colloidal alumina is un-calcined with a sufficient number of hydroxyl groups such that the total particle weight loss (as distinguished from just water weight loss discussed above) upon ignition is between from 5% to 34%, more preferably from 20% to 31%. The colloidal alumina size is preferably from S nm to 400 $\mu$m, preferably at least 30 wt % is less than 25 $\mu$m and 95 wt % is less than 100 $\mu$m. The colloidal silica is preferably un-calcined with a sufficient number of hydroxyl groups such that the total particle weight loss upon ignition is between from 5% to 37%, more preferably from 20% to 31%. The colloidal silica size is preferably from 5 nm to 250 $\mu$m, preferably at least 30 wt % is less than 25 $\mu$m and 95 wt % is less than 100 $\mu$m. In one embodiment, the binder is from 1% to 99.9% by weight of the mixture, preferably from 10% to 35% by weight. As used herein, the binder will be referred to as "colloidal" to distinguish it from particle b, as the composition types can be the same, e.g. both can contain aluminum oxides.

Although prior art binders can be used in combination with the binder system of the present invention, these prior art binders lack certain advantages. In the present invention, the activity is not degraded when exposed to aqueous solutions. The system is also very durable and not subject to falling apart when exposed to a waste stream, unlike other prior art adsorbent and/or catalyst and binder systems, such as polyvinyl pyrolidone, starch, or cellulose.

The invention contemplates the use of any prior art oxide adsorbent and/or catalyst particle or composite particle of two or more types of particles and binder system, but replacing the prior art binder with the binder of the present invention. In one aspect, the invention provides an adsorbent and/or catalyst and binder system comprising a binder that has been cross-linked with at least one type of oxide adsorbent and/or catalyst particles. In one embodiment, component b comprises at least two different types of oxide adsorbent and/or catalyst particles, to form a cross-linking between the binder and both particles to thereby form a composite particle. In another embodiment, component b comprises at least three different types of adsorbent and/or catalyst particles. In a preferred embodiment, component b comprises an oxide particle, preferably a metal oxide particle, and even more preferably a non-ceramic, porous metal oxide particle. Examples of such particles include, but are not limited to, oxide complexes, such as transition metal oxides, lanthanide oxides, thorium oxide, as well as oxides of Group IIA (Mg, Ca, Sr, Ba), Group IIIA (B, Al, Ga, In, Tl), Group IVA (Si, Ge, Sn, Pb), and Group VA (As, Sb, Bi). In general, any oxide complex that is a basic anhydride is suitable for component b. In another embodiment, component b comprises an oxide of aluminum, titanium, copper, vanadium, silicon, manganese, iron, zinc, zirconium, tungsten, rhenium, arsenic, magnesium, thorium, silver, cadmium, tin, lead, antimony, ruthenium, osmium, cobalt or nickel or zeolite. Typically, any oxidation state of the oxide complexes may be useful for the present invention. The oxide can be a mixture of at least two metal oxide particles having the same metal with varying stoichiometry and oxidation states. In one embodiment, component b comprises $Al_2O_3$, $TiO_2$, $CuO$, $Cu_2O$, $V_2O_5$, $SiO_2$, $MnO_2$, $Mn_2O_3$, $Mn_3O_4$, $ZnO$, $WO_2$, $WO_3$, $Re_2O_7$, $AS_2O_3$, $As_2O_5$, $MgO$, $ThO_2$, $Ag_2O$, $AgO$, $CdO$, $SnO_2$, $PbO$, $FeO$, $Fe_2O_3$, $Fe_3O_4$, $Ru_2O_3$, $RuO$, $OsO_4$, $Sb_2O_3$, $CoO$, $Co_2O_3$, $NiO$ or zeolite. In a further embodiment, component b further comprises a second type of adsorbent and/or catalyst particles of an oxide of aluminum, titanium, copper, vanadium, silicon, manganese, iron, zinc, zirconium, tungsten, rhenium, arsenic, magnesium, thorium, silver, cadmium, tin, lead, antimony, ruthenium, osmium, cobalt or nickel or zeolite, activated carbon, including coal and coconut carbon, peat, zinc or tin. In another embodiment, component b further comprises a second type of adsorbent and/or catalyst particles of aluminum oxide, titanium dioxide, copper oxide, vanadium pentoxide, silicon dioxide, manganese dioxide, iron oxide, zinc oxide, zeolite, activated carbon, peat, zinc or tin particle. Typical zeolites used in the present invention include "Y" type, "beta" type, mordenite, and ZsM5. In a preferred embodiment, component b comprises non-amorphous, non-ceramic, crystalline, porous, calcined aluminum oxide that was produced by calcining the precursor to the calcined aluminum oxide at a particle temperature of from 400° C. to 700° C., preferably in the gamma, chi-rho, or eta form. The precursor to calcined aluminum oxide can include but is not limited to boehmite, bauxite, pseudoboehmite, scale, Al(OH)$_3$ and alumina hydrates. In the case of other metal oxide complexes, these complexes can also be calcined or uncalcined.

The adsorbent and/or catalyst particles used in this invention can be unenhanced or enhanced by processes known in the art or described below. For example, the particles can be dried to be activated or can be of a composition or treated by ion or electron beam or acid activation or enhancement treatment processes disclosed in the prior filed parent applications of and in applicants' two copending applications filed on the same date as this application and entitled (1) "Enhanced Adsorbent and Room Temperature Catalyst Particle and Method of Making and Using Therefor," which is a continuation-in-part of PCT/US96/05303, filed Apr. 17, 1996, pending, which is a continuation-in-part of U.S. application serial No. 08/426,981, filed Apr. 21, 1995, pending, and (2) "Acid Contacted Enhanced Adsorbent Particle and Method of Making and Using Therefor," which is a continuation-in-part of U.S. application Ser. No. 08/662, 331, filed Jun. 12, 1996, pending, which is a continuation-in-part of PCT/US95/15829, filed Jun. 12, 1995, pending, which is a continuation-in-part of U.S. application Ser. No. 08/351,600, filed Dec. 7, 1994, abandoned, the disclosures of both applications filed on the same date as this application and all of their prior filed priority applications are herein incorporated by this reference in their entireties for all of their teachings, indirectly, but not limited to particle compositions and methods of treatment.

An acid is required to cross-link the binder with component b. The addition of an acid to the binder facilitates or enables the reaction between the binder and the oxide particle. A strong or dilute acid can be used. A dilute acid is preferred to minimize etching of certain particles. Typically the acid is diluted with water to prevent dissolution of the particle and for cost effectiveness. The acid treatment is preferably of a concentration (i.e. acid strength as measured by, e.g., normality or pH), acid type, temperature and length of time to cross-link the binder and component b.

In one embodiment, the acid comprises nitric acid, sulfuric acid, hydrochloric acid, boric acid, acetic acid, formic acid, phosphoric acid or mixtures thereof, preferably acetic acid or nitric acid. In another embodiment, the concentration of the acid is from 0.15N to 8.5N, preferably from 0.5N to 1.7N. The volume of dilute acid used must be high enough so that the adsorbent and/or catalyst particle of the present invention can be used as is or further processed, such as extruded or filter pressed.

In order to ensure efficient cross-linking between the binder and the oxide particle component, water is removed from the resulting binder system. This is typically performed by using a drying agent or heating the system. The cross-linking temperature as used herein is the temperature at which cross-linking between the binder and the oxide adsorbent and/or catalyst component b occurs at an acceptable rate or the temperature at which the binder reacts with itself at an acceptable rate. In one embodiment, the cross-linking temperature is from 25° C. to 400° C. Thus, in one embodiment, the cross-linking temperature for certain binders is at room temperature although the rate of cross-linking at this temperature is slow. In a various embodiments, the cross-linking temperature is from 50° C., 70° C., 110° C., or 150° C. to 200° C., 250° C., 300° C., or 350° C, preferably 150° C. to 300° C., even more preferably about 250° C. The cross-linking process can take place in open air, under an inert atmosphere or under reduced pressure. The cross-linking temperature can effect the activity of the adsorbent and/or catalyst and binder system. When cross-linking occurs in the open air, then the particle is more susceptible to oxidation as the cross-linking temperature is increased. Oxidation of the particle can ultimately reduce the activity of the particle.

Preferably, during or after step (i), the mixture of step (i) is not heated above the cross-linking temperature of the colloidal metal oxide or colloidal metalloid oxide. Preferably, during or after step (i), the mixture of step (i) is not heated to or above the calcining temperature of the colloidal metal oxide or colloidal metalloid oxide. Preferably, during or after step (i), the mixture of step (i) is not heated to or above the calcining temperature of the particle. In various embodiments, during or after step (i), the mixture of step (i) is not heated above 500° C., 450° C., 400° C., 350° C., 300° C., or 250° C., preferably not above 400° C. Cross-linking should be distinguished from calcining. Calcining typically involves heating a particle to remove any residual water that may be on the particle as well as change the lattice structure of the particle to form a crystalline particle. For example for producing a crystalline aluminum oxide particle, the calcining temperature is about 400° C. to about 700° C. Calcining also removes the hydroxyl groups on the binder that are required for cross-inking. Therefore, heating the system during or after step (i) above the cross4inking temperature into the particle or binder calcining temperature range or above is detrimental to the system. Thus, prior art systems, where mixtures of colloidal alumina and/or colloidal silica are (1) calcined or recalcined or (2) heated to form a refractory material are not a part of this invention.

In another aspect, the invention provides for an adsorbent and/or catalyst system made by the process of the invention.

The binder system of the invention is made in one embodiment by the following general process. The (1) binder and (2) adsorbent and/or catalyst particles are pre-mixed in dry form. The colloidal binder can be added or prepared in situ. For example, alum could be added as a dry powder and converted to colloidal alumina in situe. Other aluminum based compounds can be used for the in situ process, such as aluminum chloride, aluminum secondary butoxide, and the like. A solution of the acid is added to the mixture, and the mixture is stirred or agitated, typically from 1 minute to 2 hours, preferably from 10 minutes to 40 minutes, until the material has a homogeneous "clay" like texture. The mixture is then ready for cross-linking or can be first fed through an extruder and then cut or chopped into a final shape, preferably spheres, pellets or saddles, typically of a size from 0.2 mm to 3 mm, preferably 0.5 to 1.5 mm. After the final shape is made, the product is transferred to a drying oven where they are dried from 15 minutes to 4 hours, preferably from 30 minutes to 2 hours. Once the binder is added to the adsorbent and/or catalyst particles (component b), the mixture is not heated to calcine or recalcine the particle b or binder. Such calcining or recalcining would detrimentally change the surface characteristics of component b by closing up the micropores. Additionally, the particles of the invention are preferably not sintered, as this would detrimentally affect the micropores by closing up the micropores and would detrimentally decrease the pore volume and surface area. The particles and binder system are also not heated above the calcining temperature to form a refractory material. Any other process that would increase the size or eliminate micropores, enlarge the size of, create macropores at the expense of micropores or destroy macropores, or would decrease the surface area available for adsorption or catalysis should preferably be avoided.

The size and shape of the particles used in this invention prior to extruding can vary greatly depending on the end use. Typically, for adsorption or catalytic applications, a small particle size such as 5 μm or greater to about 250 μm are preferable because they provide a larger surface area than large particles.

In yet another aspect, the invention provides a method for reducing or eliminating the amount of a contaminant from a liquid or gas stream comprising contacting the adsorbent and/or catalyst binder system with the contaminant in the stream for a sufficient time to reduce or eliminate the amount of contaminant from the stream. In one embodiment, the stream is a liquid, preferably water. In another embodiment, the stream is a gas, preferably comprising air or natural gas.

The adsorbent and/or catalyst binder system of this invention can be used for environmental remediation applications. In this embodiment, contaminants from a liquid or gas stream can be reduced or eliminated by a catalysis reaction. In another embodiment, contaminants from a liquid or gas stream can be reduced or eliminated by an adsorption reaction. The particle can be used to remove contaminants, such as, but not limited to, heavy metals, organics, including hydrocarbons, chlorinated organics, including chlorinated hydrocarbons, inorganics, or mixtures thereof. Specific examples of contaminants include, but are not limited to, acetone, ammonia, benzene, carbon monoxide, chlorine, hydrogen sulfide, trichloroethylene, 1,4-dioxane, ethanol, ethylene, formaldehyde, hydrogen cyanide, hydrogen sulfide, methanol, methyl ethyl ketone, methylene chloride, oxides of nitrogen such as nitrogen oxide, propylene, styrene, oxides of sulfur such as sulfur dioxide, toluene, vinyl chloride, arsenic, cadmium, chlorine, 1,2-dibromochloropropane (DBCP), iron, lead, phosphate, radon, selenium, or uranium. The adsorbent and/or catalyst binder system of this invention can remediate individual contaminants or multiple contaminants from a single source. This invention achieves improved efficiency by adsorbing a higher amount of contaminants and by reducing the contamination level to a much lower value than by non-enhanced particles.

In yet another aspect, the invention provides a method for catalyzing the degradation of an organic compound comprising contacting the organic compound with the adsorbent and/or catalyst system for a sufficient time to catalyze the degradation of an organic compound. In one embodiment, the catalysis reaction is at room temperature. In a one embodiment, the organic compound is a chlorinated organic compound, such as trichloroethylene (TCE). In one embodiment, the catalyst and binder system catalyzes the hydrolysis of the chlorinated organic compounds.

In yet another aspect, the invention provides a method for reducing or eliminating the amount of a contaminant from a gas stream by catalysis comprising contacting the adsorbent and/or catalyst binder system with a gas stream containing a contaminant comprising an oxide of nitrogen, an oxide of sulfur, carbon monoxide, hydrogen sulfide, or mixtures thereof for a sufficient time to reduce or eliminate the contaminant amount. In one embodiment, the catalysis reaction is at room temperature.

For environmental remediation applications, adsorbent and/or catalyst particles of the invention are typically placed in a container, such as a filtration unit. The contaminated stream enters the container at one end, contacts the particles within the container, and the purified stream exits through another end of the container. The particles contact the contaminants within the stream and bond to and remove the contamination from the stream. Typically, the particles become saturated with contaminants over a period of time, and the particles must be removed from the container and replaced with fresh particles. The contaminant stream can be a gas stream or liquid stream, such as an aqueous stream. The particles can be used to remediate, for example, waste water, production facility effluent, smoke stack gas, auto exhaust, drinking water, and the like.

The particle/binder system of the invention can be used preferably as the adsorbent or catalytic medium itself. In an alternate embodiment, the system is used as an adsorbent or catalytic support.

When the particle adsorbs a contaminent, the particle of this invention bonds with the contaminant so that the particle and contaminant are tightly bound. This bonding makes it difficult to remove the contaminant from the particle, allowing the waste to be disposed of into any public landfill. Measurements of contaminants adsorbed on the particles of this invention using an EPA Toxicity Characteristic Leachability Procedure (TCLP) test known to those of skill in the art showed that there was a very strong interaction between the particles of this invention and the contaminants such that the contaminant is held very tightly.

Although the particle system bonds tightly to the contaminent, the system of the invention can be regenerated by various techniques, such as by roasting it in air to reoxidize the particles.

In one embodiment, component b comprises aluminum oxide, copper oxide, and manganese dioxide. In this embodiment, the binder is preferably colloidal alumina. In this embodiment, the acid is preferably acetic acid. In this embodiment, the binder is from 1 to 99.9 parts by weight, preferably from 5 to 35 parts by weight, the aluminum oxide is from 1 to 99.9 parts by weight, preferably from 55 to 85 parts by weight, the copper oxide is from 1 to 99.9 parts by weight, preferably from 1 to 20 parts by weight, and the manganese oxide is from 1 to 99.9 parts by weight, preferably from 1 to 20 parts by weight. In another embodiment, the binder is 20 parts by weight, aluminum oxide is 70 parts by weight, copper oxide is 5 parts by weight, and manganese dioxide is 5 parts by weight.

In another embodiment, component b comprises aluminum oxide and activated carbon. In this embodiment, the binder is preferably colloidal alumina. In this embodiment, the acid is preferably acetic acid. In this embodiment, the binder is from 1 to 99.9 parts by weight, preferably from 5 to 35 parts by weight, the aluminum oxide is from 1 to 99.9 parts by weight, preferably from 45 to 75 parts by weight, and the activated carbon is from 1 to 99.9 parts by weight, preferably from 35 to 55 parts by weight. In another embodiment, the binder is 20 parts by weight, aluminum oxide is 60 parts by weight, and activated carbon is 5 parts by weight.

In another embodiment, component b comprises copper oxide and manganese dioxide. In this embodiment, the binder is preferably colloidal alumina. In this embodiment, the acid is preferably acetic acid. In this embodiment, the binder is from 1 to 99.9 parts by weight, preferably from 5 to 35 parts by weight, the copper oxide is from 1 to 99.9 parts by weight, preferably from 35 to 55 parts by weight, and the manganese dioxide is from 1 to 99.9 parts by weight, preferably from 25 to 55 parts by weight. In another embodiment, the binder is 20 parts by weight, copper oxide is 40 parts by weight, and manganese dioxide is 40 parts by weight.

In another embodiment, component b comprises aluminum oxide, copper oxide, manganese dioxide and activated carbon. In this embodiment, the binder is preferably colloidal alumina. In this embodiment, the acid is preferably acetic acid. In this embodiment, the binder is from 1 to 99.9 parts by weight, preferably from 5 to 35 parts by weight, the aluminum oxide is from I to 99.9 parts by weight, preferably from 45 to 75 parts by weight, the copper oxide is from 1 to 99.9 parts by weight, preferably from 1 to 20 parts by weight, the manganese dioxide is from 1 to 99.9 parts by weight, preferably from 1 to 20 parts by weight, and activated carbon is from 1 to 99.9 parts by weight, preferably from 1 to 25 parts by weight. In another embodiment, the binder is 19.9 parts by weight, aluminum oxide is 60 parts by weight, copper oxide is 5.98 parts by weight, manganese dioxide is 4.98 parts by weight, and activated carbon is 9.95 parts by weight.

In another embodiment, the component b comprises aluminum oxide, silicon dioxide and activated carbon. In a further embodiment, the particle comprises 1–99 parts, preferably 5–35 parts, more preferably 20 parts by weight aluminum oxide, 1–99 parts, preferably 5–35 parts, more preferably 20 parts by weight silicon dioxide and 1–99 parts, preferably 25–55 parts, more preferably 40 parts by weight activated carbon. In this embodiment, the binder is preferably colloidal alumina and the acid is preferably acetic acid. The binder is from 1 to 99.9 parts by weight, preferably from 5 to 35 parts by weight In another embodiment, the catalyst and binder system can be used as an oxidation catalyst. In one embodiment, the system comprises colloidal alumina as a binder, $Al_2O_3$, and one or more of the following oxide particles of $V_2O$, $WO_2$, $WO_3$, $TiO_2$, $Re_2O_7$, $As_2O_3$, $As_2O_5$, $OSO_4$, or $Sb_2O_3$. In another embodiment, the colloidal alumina is from 10 to 30 parts by weight, $Al_2O_3$ is from 1 to 90 parts by weight, and $V_2O_5$, $WO_2$, $WO_3$, $TiO_2$, $Re_2O_7$, $As_2O_3$, $As_2O_5$, $OSO_4$, or $Sb_2O_3$ are each from 1 to 90 parts by weight.

In another embodiment, the catalyst and binder system can be used as a Lewis acid catalyst. In one embodiment, the system comprises colloidal alumina as a binder, $Al_2O_3$, and one or more of the following oxide particles of $V_2O_5$, $ZrO_2$, $TiO_2$, MgO, $ThO_2$ or lanthanide oxides. In another embodiment, the colloidal alumina is from 10 to 30 parts by weight, $Al_2O_3$ is from 1 to 90 parts by weight, and $V_2O_5$, $ZrO_2$, $TiO_2$, MgO, $ThO_2$ or lanthanide oxides are each from 1 to 90 parts by weight.

In another embodiment, the catalyst and binder system can be used as a cracking catalyst. In one embodiment, the system comprises colloidal alumina as a binder, $Al_2O_3$, and one or more of the following oxide particles of CuO, ZnO, $Ag_2O$, AgO, CdO, $SnO_2$, PbO, $V_2O_5$, $ZrO_2$, MgO, $ThO_2$ or lanthanide oxides. In another embodiment, the colloidal alumina is from 10 to 30 parts by weight, $Al_2O_3$ is from 1 to 90 parts by weight, and CuO, ZnO, $Ag_2O$, AgO, CdO, $SnO_2$, PbO, $V_2O_5$, $ZrO_2$, MgO, $ThO_2$ or lanthanide oxides are each from 1 to 90 parts by weight.

In another embodiment, the catalyst and binder system can be used as a reduction catalyst. In one embodiment, the system comprises colloidal alumina as a binder, $Al_2O_3$, and one or more of the following oxide particles of $MnO_2$, $Fe_2O_3$, $Fe_3O_4$, $Ru_2O_3$, $OSO_4$, CoO, $Co_2O_3$, RuO or NiO. In another embodiment, the colloidal alumina is from 10 to 30 parts by weight, $Al_2O_3$ is from 1 to 90 parts by weight, and $MnO_2$, $Fe_2O_3$, $Fe_3O_4$, $Ru_2O_3$, $OSO_4$, CoO, $Co_2O_3$, RuO or NiO are each from 1 to 90 parts by weight.

In another embodiment, the catalyst and binder system can be used as a coal gasification catalyst. In one embodiment, the system comprises colloidal alumina as a binder, $Al_2O_3$, and one or more of the following oxide particles of $Fe_2O_3$, $Fe_3O_4$, CoO or $Co_2O_3$. In another embodiment, the colloidal alumina is from 10 to 30 parts by weight, $Al_2O_3$ is from 1 to 90 parts by weight, and $Fe_2O_3$, $Fe_3O_4$, CoO, or $Co_2O_3$, are each from 1 to 90 parts by weight.

In another embodiment, the catalyst and binder system can be used as a coal gas reforming catalyst. In one embodiment, the system comprises colloidal alumina as a binder, $Al_2O_3$, and one or more of the following oxide particles of $Fe_2O_3$, $Fe_3O_4$, CoO or $Co_2O_3$. In another embodiment, the colloidal alumina is from 10 to 30 parts by weight, $Al_2O_3$ is from 1 to 90 parts by weight, and $Fe_2O_3$, $Fe_3O_4$, CoO, or $Co_2O_3$, are each from 1 to 90 parts by weight.

In another embodiment, the catalyst and binder system can be used as a hydrogenation catalyst. In one embodiment, the system comprises colloidal alumina as a binder, $Al_2O_3$, and one or more of the following oxide particles of $Fe_2O_3$, $Fe_3O_4$, CoO or $Co_2O_3$. In another embodiment, the colloidal alumina is from 10 to 30 parts by weight, $Al_2O_3$ is from 1 to 90 parts by weight, and $Fe_2O_3$, $Fe_3O_4$, CoO or $Co_2O_3$ are each from 1 to 90 parts by weight.

In another embodiment, the catalyst and binder system can be used as a desiccant. In one embodiment, the system comprises colloidal alumina as a binder, $Al_2O_3$, and one or more of the following oxide of zeolite, MgO, or $ThO_2$. In another embodiment, the colloidal alumina is from 10 to 30 parts by weight, $Al_2O_3$ is from I to 90 parts by weight, and zeolite, MgO, or $ThO_2$ are each from 1 to 90 parts by weight.

In another embodiment, the catalyst and binder system can be used as a catalyst support. In one embodiment, the system comprises colloidal alumina as a binder, $Al_2O_3$, and one or more of the following oxide particles of MgO or $ThO_2$. In another embodiment, the colloidal alumina is from 10 to 3 0 parts by weight, $Al_2O_3$ is from 1 to 90 parts by weight, and MgO or $ThO_2$ are each from 1 to 90 parts by weight.

In another embodiment, the invention relates to a composition for binding adsorbent and/or catalytic particles to produce an agglomerated particle comprising (a) a colloidal metal oxide or colloidal metalloid oxide and (b) an acid. In this composition, in one embodiment, the colloidal metal oxide or colloidal metalloid oxide comprises colloidal alumina or colloidal silica. In this composition, in one embodiment, the acid is acetic acid or nitric acid.

In another embodiment, the invention relates to a method for binding adsorbent and/or catalytic particles, comprising the steps of:

(a) mixing colloidal alumina or colloidal silica with the particles and an acid;

(b) agitating the mixture to homogeneity; and (c) heating the mixture for a sufficient time to cause cross-linking of the aluminum oxide in the mixture.

In one embodiment, the colloidal alumina or colloidal silica is colloidal alumina. In another embodiment, the colloidal alumina is from 20% to 99% by weight of the mixture. In another embodiment, the acid is nitric acid.

Experimental

The following examples are put forth so as to provide those of ordinary skill in the art with a complete disclosure and description of how the compounds claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in °C. or is at or near room temperature and pressure is at or near atmospheric.

EXAMPLE 1

Various particles were made in accordance with the procedures of this invention as follows:

i) The procedures used to prepare the particle designated as 1a in Table 1 below, having a composition of 60% $Al_2O_3$, 20% carbon, 15% manganese dioxide and 5% copper oxide, is exemplified. The alumina utilized was a gamma calcined (550° C.) alumina derived from a high density, low porosity pseudoboehmite alumina or alumina gel. The alumina was pretreated by calcining to 550° C. to reach the desired gamma crystalline structure. The carbon utilized in this particle was a coconut based carbon, designated as Polynesian coconut based carbon purchased from Calgon Carbon Corporation. Due to the use of coconut shells in the manufacture of this carbon, there exists a very large surface area as well as micro-pores which are useful for removing contaminants in a gas stream. The four individual particle types were mixed together in their appropriate weight per cents according to the dry weight. They were mixed together into a homogenous dry mixture. A solution of 16% nitric acid was added to the dry particle mixture slowly until the mixture obtained a moist pasty consistency. This consistency allowed the mixture to be extruded into the desired form. The mixture was extruded using a LCI model BTG® laboratory extruder. After the mixture was extruded, the extrudate was chopped up into approximately one-sixteenth to one-eighth inch particles and then was dried as described below.

ii) The particles were placed in a vacuum/pressure vessel chamber on an ungrounded target plate. The door to the chamber was secured, and air was pumped out of the chamber down to a pressure of two militorr. Upon reaching this pressure, argon gas was allowed to bleed into the chamber and reach an internal gauge pressure of about 20 psi. Upon reaching this pressure, the energy beam source was activated to 15 to 20 eV and was applied to the particle on the target area. A Commonwealth Scientific Corp. broad beam ion source was used. Treatment times for the particles vary according to the amount and density of material on the target. For this example, a volume of 50 grams of material was used and a treatment time of ten seconds was used. The treatment times also vary according to the output power from the energy beam source and the internal pressure in the chamber. After ten seconds, the ion source was turned off and the chamber was vented to atmospheric pressure. The sample was then removed from the chamber.

Particles 1b through 1aa were similarly made in accordance with the above-described example for 1a except that the particular compositions were as set forth in Table 1. Also, the carbon utilized for aqueous particle designations 1v and 1w was a coal based carbon. This coal based carbon was purchased from Calgon Carbon Corporation as WHP grade carbon. The particular alumina utilized in particles 1b through 1aa was the same as described above for particle 1a, a gamma calcined alumina. The other components listed below in Table 1 are well known and are readily available to one of skill in the art.

Each of the particle's composition was made in accordance with the procedures of this invention described above. All of the particles in Table 1 that used more than one particle type with the exception of 1v, 1w, and 1aa contained 3% by weight polyvinylpyrrolidinone binder. These particles were dried at 150° C. for 30 minutes under reduced pressure. For particles 1v, 1w, and 1aa, 20% by weight colloidal alumina as the binder was used. This 20% of colloidal alumina binder is included in the wt % provided for the aluminum oxide in Table 1 for these particles 1v, 1w, and 1aa, providing 20% colloidal alumina and 20% gamma calcined alumina based on the total composition. These particles were dried at 250° C. for 1 hour. The ability of these particles to remediate contaminants was investigated in Examples 2 and 3. The same particle designation system is used in Tables 1–3.

TABLE 1

| PARTICLE DESIGNATION | COMPOSITION[1] (weight %) | CONTAMINANTS AIRBORNE | AQUEOUS |
|---|---|---|---|
| 1a | 60% $Al_2O_3$, 20% Carbon, 15% $MnO_2$, 5% CuO | Acetone | |
| 1b | 100% $Al_2O_3$ | Ammonia | |
| 1c | 50% $Al_2O_3$, 40% Carbon, 10% $SiO_2$ | Benzene | |
| 1d | 40% $Al_2O_3$, 30% $V_2O_5$, 20% $MnO_2$, 10% $TiO_2$ | Carbon Monoxide | |
| 1e | 100% $Al_2O_3$ | Chlorine | |
| 1f | 100% $Al_2O_3$ | 1,4-Dioxane | |
| 1g | 100% $Al_2O_3$ | Ethanol | |
| 1h | 100% $M_2O_3$ | Formaldehyde | |
| 1i | 40% $Al_2O_3$, 30% $MnO_2$, 20% $V_2O_5$, 5% Zeolite, 5% $Fe_2O_3$ | Hydrogen Cyanide | |
| 1j | 30% $Al_2O_3$, 50% $MnO_2$, 5% Carbon, 5% $SiO_2$, 10% ZnO | Hydrogen Sulfide | |
| 1k | 90% $Al_2O_3$, 10% Carbon | Methanol | |
| 1l | 100% $Al_2O_3$ | Methyl Ethyl Ketone | |
| 1m | 40% $Al_2O_3$, 20% $MnO_2$, 10% CuO, 30% $V_2O_5$ | Methylene Chloride | |
| 1n | 10% $Al_2O_3$, 5% CuO, 45% $MnO_2$, 5% zeolite | Nitrogen Oxides | |
| 1o | 30% $M_2O_3$, 70% Carbon | Propylene | |
|  | 30% $Al_2O_3$, 70% Carbon | Styrene | |
| 1q | 100% $M_2O_3$ | Sulfur Dioxide | |
| 1r | 40% $Al_2O_3$, 30% $MnO_2$, 30% Carbon | Toluene | |
| 1s | 30% $M_2O_3$, 70% Carbon | Vinyl Chloride | |
|  | 100% $M_2O_3$ | | Arsenic |
|  | 100% $Al_2O_3$ | | Cadmium |
| 1v | 40% $M_2O_3$, 40% Carbon, 20% $SiO_2$ | | Chlorine |
| 1w | 40% $M_2O_3$, 40% Carbon, 20% $SiO_2$ | | DBCP |
| 1x | 100% $Al_2O_3$ | | Iron |
| 1y | 100% $M_2O_3$ | | Lead |
|  | 100% $Al_2O_3$ | | Phosphate |
| 1aa | 40% $Al_2O_3$, 40% Carbon, 20% $SiO_2$ | | Radon |

[1]Activated carbon coconut based was used for the airborne contaminants and for 1aa (radon) and activated carbon coal based was used for aqueous contaminants 1v and 1w.

EXAMPLE 2

The particles made in Example 1 were tested for their ability for removal of various components from air. The tests for the airborne contaminants as summarized in Table 2 below were performed as follows. The contaminant source used was either solvent vapor or an off the shelf bottled gas mixture.

A flow-temperature-humidity control system produced an air stream flowing at S5.5 liters per minute at 25° C. and 30% relative humidity. The humidified air was blended with the solvent vapor which was injected into the air stream using a syringe pump. A solvent vaporizer was sometimes used to assist in the evaporation of the solvent at elevated concentrations. The concentration was regulated by the rate of injection. The challenge concentration was measured using an infared analyzer set at a specific analytical wavelength. The vapor mixture then enters the sample holder. After passing through the sample, the downstream concentration was monitored with another infared analyzer for the duration of the test.

The gas flow of interest was measured with either a rotameter or a mass flow controller and was blended with a humidified air stream. The mixture then was blended with the humidified air stream. After the influent infrared analysis, the sample entered a sample holder. The sample holder was a three-inch diameter test vessel, which held a 200 μm amount of particle sample in place using a fritted disk. After passing through the particles, the concentration of the contaminant in the effluent exited the sample holder. The concentration of the contaminent in the effluent side of the particle sample holder was also analyzed with an infrared analyzer. The mixture then passes through the sample. The downstream concentration was measured with either an infared analyzer or an Interscan electrochemical specific gas monitor.

Calibration was conducted on each system component prior to testing. The infared analyzers were calibrated using the static closed loop technique. The electrochemical analyzers were checked using certified gas mixtures. The air flow was checked against a dry gas meter which in turn had been compared to a five cubic foot spirometer. The humudity was checked using the staurated salt technique. The temperature probe was compared to a U.S. Bureau of Standards certified mercury in glass thermometer.

The test time was ten minutes. Percent removal was calculated as (initial contaminant concentration minus effluent contaminant concentration) divided by initial contaminant concentration. The results are set forth in Table 2 below.

TABLE 2

| PARTICLE DESIGNATION | AIRBORNE CONTAMINANT | INITIAL CONTAMINANT CONCENTRATION (ppm) | PERCENT REMOVAL | FLOW RATE[1] |
|---|---|---|---|---|
| 1a | Acetone | 750 | 100 | 55.5 l/min |
|  | Ammonia | 50 | 100 | 55.5 l/min |
| 1c | Benzene | 50 | 100 | 55.5 l/min |
| 1d | Carbon Monoxide | 10000 | 100 | 55.5 l/min |
| 1e | Chlorine | 34 | 100 | 55.5 l/min |
| 1f | 1A-Dioxane | 50 | 100 | 55.5 l/min |
| 1g | Ethanol | 1000 | 100 | 55.5 l/min |
| 1h | Formaldehyde | 10 | 100 | 55.5 l/min |
| 1i | Hydrogen Cyanide | 20 | 100 | 55.5 l/min |
| 1j | Hydrogen Sulfide | 20 | 100 | 55.5 l/min |
| 1k | Methanol | 200 | 100 | 55.5 l/min |
| 1l | Methyl Ethyl Ketone | 1000 | 100 | 55.5 l/min |
| 1m | Methylene chloride | 50 | 100 | 55.5 l/min |
| 1n | Nitrogen Oxides | 100 | 100 | 55.5 l/min |
| 1o | Propylene | 700 | 100 | 55.5 l/min |
| 1p | Styrene | 50 | 100 | 55.5 l/min |
|  | Sulfur Dioxide | 20 | 100 | 55.5 l/min |
|  | Toluene | 100 | 100 | 55.5 l/min |
| 1s | Vinyl Chloride | 20 | 100 | 55.5 l/min |

[1] 40 film/min velocity, 55.5 l/min volumetric flow.

In Table 2 above, for the formaldehyde test using particle 1h, formaldehyde was not detected on the particle after the test was completed and, as shown in Table 2, no formaldehyde was detected in the effluent stream. This particle 1 acts as a catalyst towards formaldehyde and oxidizes the formaldehyde into what is believed to be $CO_2$ and water, even at room temperature. This was further evidenced by a separate test in which it was shown that the formaldehyde was removed from the system over a substantially longer period of time than can be explained if the particle acted only as an adsorbent.

As can also be seen from the above Table 2, carbon monoxide and nitrogen oxides were not detected in the effluent system. It is believed that the CO is converted to $CO_2$ and water and the $NO_X$ are converted to $N_2$ and $O_2$. It is also believed that the remediation of $SO_2$ was through, at least in part, a catalysis reaction that converted $SO_2$ into other components. The catalyzed reactions were surprisingly achieved even at room temperature.

EXAMPLE 3

The particles made in Example 1 were tested for their ability for the removal of various components from water. The test procedures were as follows. For each contaminant run, 5 glass columns of 0.875 inch inner diameter by 12 inches long were prepared, each having a bed volume of test particle of 95 mls. Each bed was flushed with five bed volumes of deionized water by downward pumping at 6 gpm/ft² of cross-sectional flow rate (i.e., about 95 ml/min). Each of the flow rates listed in Table 3 is per foot squared of cross-sectional flow rate. Test solutions for each of the aqueous contaminants were prepared. A total often bed volumes, that is, about one liter per column of aqueous contaminant test solution, was pumped through each of the columns. During each run, the aqueous contaminant test solutions were continuously stirred at low speed prior to entry into the glass column to maintain a homogenous composition. During the tenth bed volume, an effluent sample from each column was collected and analyzed for the particular aqueous contaminant. Additionally, a single influent sample for each test was collected and analyzed for the contaminant concentration.

The results of these tests are set forth in Table 3 below.

TABLE 3

| PARTICLE DESIGNATION | AQUEOUS CONTAMINANT | INFLUENT | EFFLUENT | FLOW RATE | DETECTION LIMIT |
|---|---|---|---|---|---|
| 1t | Arsenic | 2,890 ppb | <10 ppb | 5–6 GPM/ft$^2$ | 10 ppb |
| 1u | Cadmium | 1,003 ppb | <10 ppb | 5–6 GPM/ft$^2$ | 10 ppb |
| 1v | Chlorine | 263 ppb | <10 ppb | 5–6 GPM/ft$^2$ | 10 ppb |
| 1w | DBCP 1,2-Dibromo-3-Chloropropane | (sw) 230.0 µg/l (sw) 210.0 µg/l (gw) 0.07 µg/l | <0.02 µg/l <0.02 µg/l <0.02 µg/l | 5–6 GPM/ft$^2$ 5–6 GPM/ft$^2$ 5–6 GPM/ft$^2$ | 0.02 µg/l 0.02 µg/l 0.02 µg/l |
| 1x | Iron | 1.15 mg/l | <0.03 mg/l | 5–6 GPM/ft$^2$ | 0.03 µg/l |
| 1y | Lead | 215 ppb | <10 ppb | 5–6 GPM/ft$^2$ | 10 ppb |
| 1z | Phosphates | 40.45 mg/l | 9.50 mg/l | 5–6 GPM/ft$^2$ | N/A |
| 1aa | Radon | 1,104.2 pCi/l 911.6 pCi/l | 303.2 pCi/l 306.1 pCi/l | 5–6 GPM/ft$^2$ 5–6 GPM/ft$^2$ | N/A | sw = Synthetic water
gw = ground water

EXAMPLE 4

A particle of 100% activated carbon coconut (non-acid treated) was irradiated by the ion-beam in accordance with the procedures of step (ii) of Example 1. An ESCA spectrometer was used to analyze the surface composition for the original activated carbon particle and the particle after it was irradiated by the ion beam. The surface characterization results are as follows.

TABLE 4

| ELEMENT | INITIAL ACTIVATED CARBON PARTICLE (Atom %) | ACTIVATED CARBON PARTICLE OF THIS INVENTION (Atom %) |
|---|---|---|
| Carbon | 96.47 | 61.65 |
| Oxygen | 3.53 | 16.37 |
| Sodium | | 0.59 |
| Fluorine | | 8.61 |
| Potassium | | 7.60 |
| Chlorine | | 1.61 |
| Sulfur | | 0.86 |
| Phosphorus | | 0.55 |
| Magnesium | | 2.5 |

Thus, the initial particle had an oxygen/carbon ratio of about 0.04, whereas the treated activated carbon particle of this invention had an oxygen/carbon ratio of about 0.27, for an increased oxygen/carbon ratio of about 7 times the original. A similar test was run on 100% aluminum oxide prepared according to the process of Example 1. The oxygen/aluminum ratio was increased at least about 2 fold over the original untreated particle oxygen/aluminum ratio.

EXAMPLE 5

A TCLP test was run on two different contaminant remediation applications of this invention. The particles were prepared by step (ii) of Example 1 and were used to adsorb the particular contaminants in Table 5 below. In accordance with the EPA test methods, the particles were, inter alia, washed with an acid solution and tumbled for the requisite length of time. The concentration of the contaminants removed from the particle were then measured. The results are set forth below in Table 5.

TABLE 5

| PARTICLE | CONTAMINANT | EPA TCLP TEST METHOD | TCLP CONTAMINANT (mg/l) | PQL[1] |
|---|---|---|---|---|
| 100% Al$_2$O$_3$ | Lead | 1311/6010 | <0.50 | 0.50 |
| 100% Al$_2$O$_3$ | Phosphate | 1311/365.4 | <0.1 | 0.1 |

[1]PQL is the practical quantitation limit, which is an BPA standard, and is different than the lowest detectable limit.

Thus, the particles of the invention, when acting as an adsorbent, bond tightly to the contaminants.

EXAMPLE 6

Figure 2:
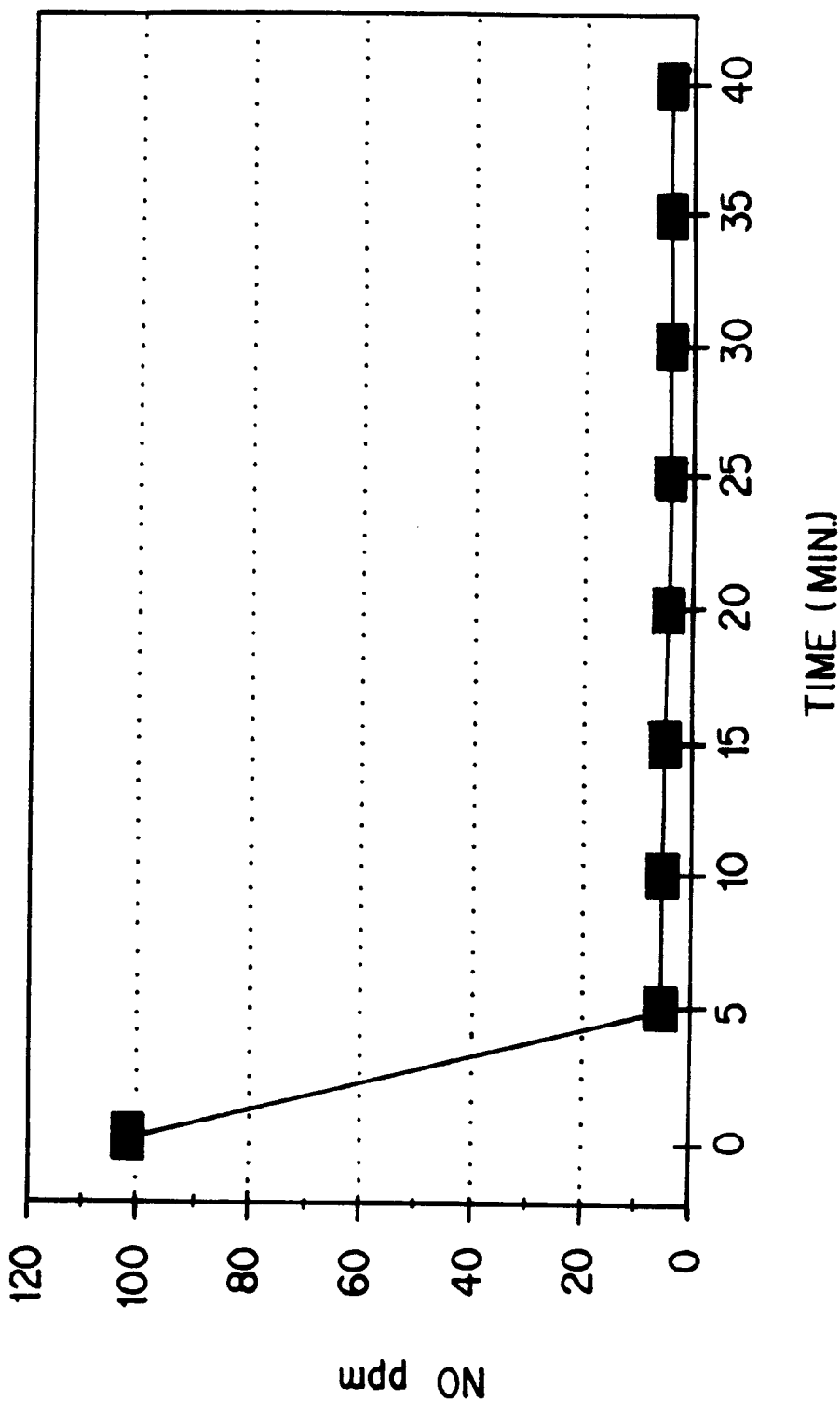
FIG. 2 is a graph showing the reduction of NO concentration using a particle of the invention.
Figure 3:
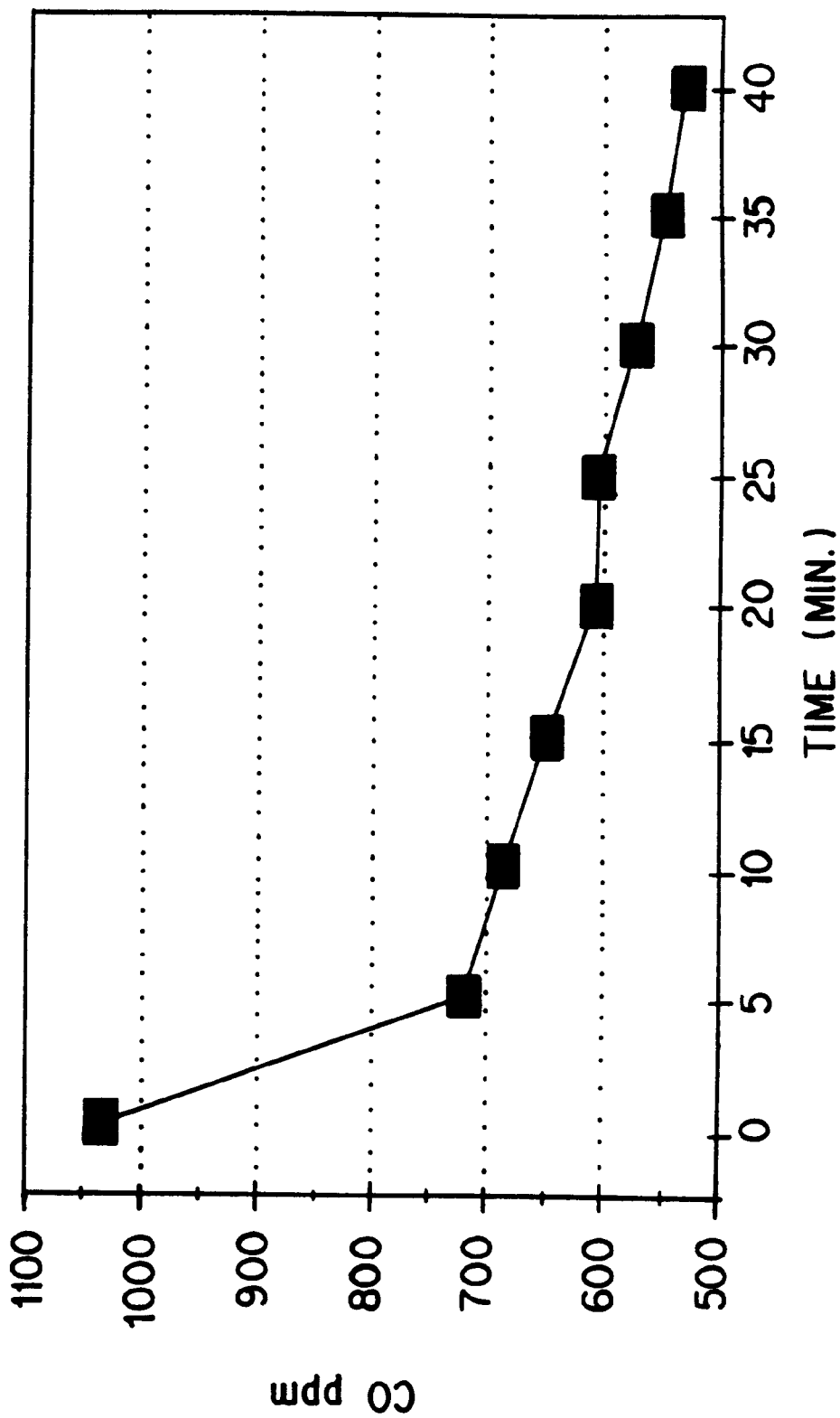
FIG. 3 is a graph showing the reduction of CO concentration using a particle of the invention.
Figure 4:
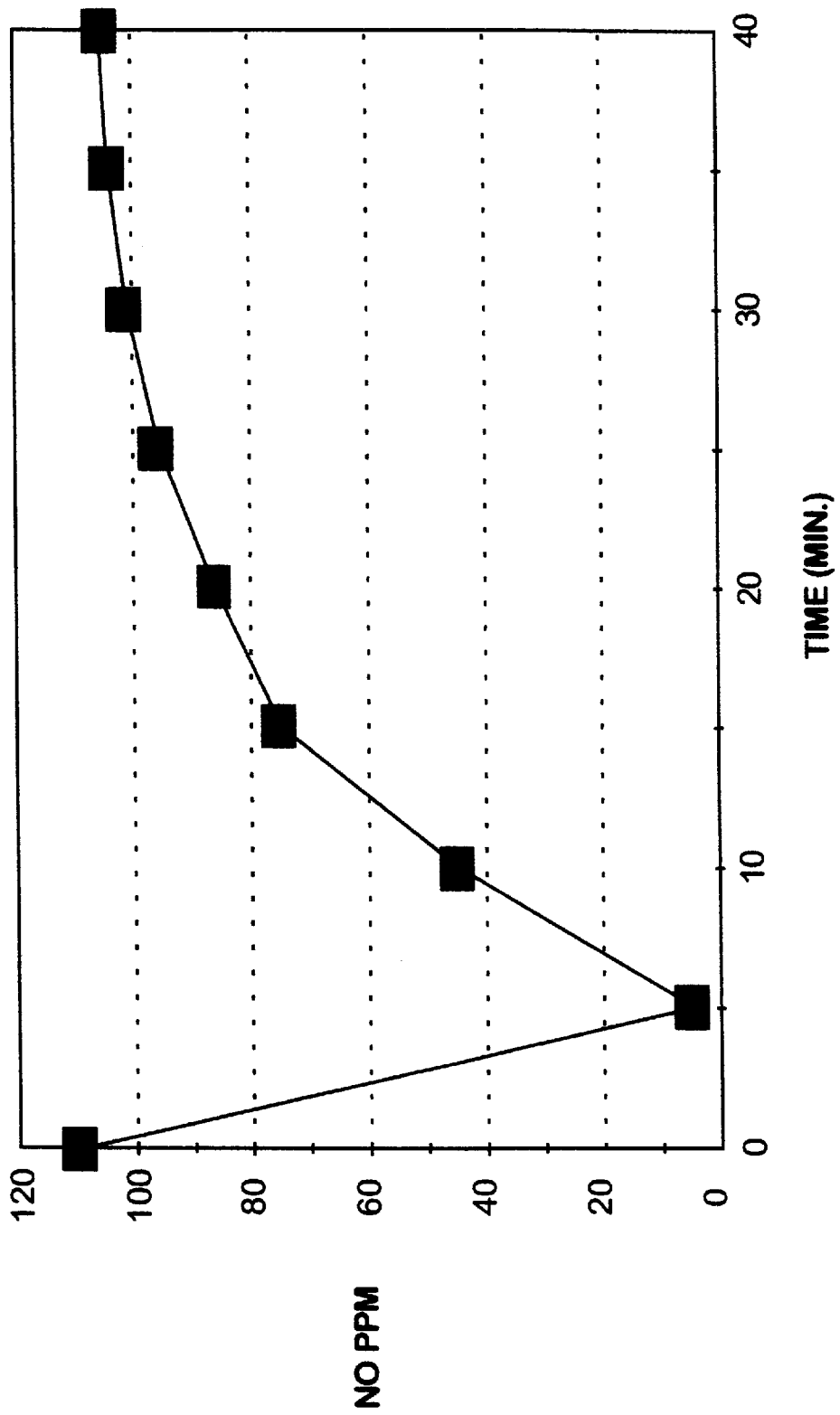
FIG. 4 is a graph showing the reduction of NO concentration using a particle that is not part of the present invention.

Two fixed bed reactors were charged with 158 g, 9.4 cubic inches (2 inches diameter×3 inches high) of In [10% Al$_2$O$_3$, 5% CuO, 45% MnO$_2$, 37% zeolite (Zeolyst international CBV), 3% PVP (GAF PVP K-60 polyvinylpyrrolidinone)] and this same particle, except that it was not irradiated by the ion beam (designated as 1n'—control for 1n). A mixture of 101.8 ppm NO and 1,035 ppm CO in air was fed into each fixed bed reactor at room temperature at a rate of 35 standard cubic feet per hour (SCFH). The effluent of the fixed bed reactor was fed into a Horiba CLA-510SS NO$_X$ analyzer and a VIA-510 CO analyzer. The NO concentration dropped immediately reaching 5.4 ppm by 5 minutes with In (the first recorded measurement) and continued to drop to 4.0 ppm by 40 min. (See, FIG. 2). The CO concentration dropped more slowly, dropping to 532 ppm at 40 min. (See, FIG. 3). The test was stopped shortly after 40 minutes. The CO concentration was still decreasing at 40 min. and may decrease further upon further reaction time. In the case of 1n', the NO concentration dropped below 10 ppm after the first five minutes (See, FIG. 4); however, the concentration rose steadily the next 25 minutes until it leveled off at approximately 105 ppm, which was very close to the initial NO concentration. It is believed that the particles of the invention catalytically degrade the CO and NO.

EXAMPLE 7

Various adsorbent and/or catalytic binder systems as set forth in Table 6 in Example 8 below were made in accordance with the general procedures of this invention as follows as well as various systems not a part of the invention.

The binder and adsorbent and/or catalytic particles were combined into a mixing vessel, the amount of each varied according to the size batch desired. However, the component ratios remained constant as indicated in Table 6 below. This "dry" combination was pre-mixed to ensure a homogenous mixture of all of the components. After this was accomplished, a solution containing 5% acetic acid in distilled water was added to the mixture. The amount of the acid compared to the other components varied depending on extruding parameters and other processing variables, but for the procedures herein the range was typically between 35 and 45 wt. % of the total mixture.

This solution was added to the dry materials and mixed until the material had a homogenous "modeling clay" like consistency. The mixing was performed utilizing a Hobart "A-300" mixer. The material was then ready for extrusion. The mixed product containing the acetic acid solution was fed through an extruder, such as a DGL-1 dome granulator manufactured by LCI Corporation of Charlotte, N.C., U.S.A. The extrudates were fed through a QJ-230 marumarizer, also manufactured by LCI Corporation, which turned the extrudates as "Rods" into small spheres. The extruding and marumarizing steps provided a finished product suitable to use for a specific application. However, the marumarizing is optional and does not alter the performance of the product. After the spheres were made, the product was transferred to a drying oven where it was dried for one (1) hour at a temperature of 250° Celsius. The product was then ready for use in an application.

EXAMPLE 8

The particles as formed of the constituents listed below in Table 6 were tested for their ability to remove TCE. Adsorbent and/or catalyst and binder systems of Table 6 were challenged with various concentrations of TCE as indicated in Table 6. Two custom made columns (40 cm×20 mm) equipped with coarse glass frits were dried packed with 10 mL volumes (measured with a 10 mL graduated cylinder) of particles. The columns were challenged with five 10 mL aliquots (5 bed volumes) of the trichloroethylene (TCE) solution. The fifth bed volume from each column was collected in a 50 mL Erlenmeyer flask, stoppered, and immediately analyzed by purge and trap-GC/MS technique using a Finnigan MAT Magnum ion trap GC/MS equipped with a Tekmar liquid sample concentrator (LSC 2000).

The particles in Table 6 were prepared as described in Example 7. The percent composition of each component as well as the nature of the binder are presented in Table 6. Prior to mixing with the other components, the aluminum oxide particle was first calcined at 500° C. or 550° C. as indicated in Table 6, then acid treated by substantially contacting with 0.5% acetic acid at room temperature for 15 minutes as generally set forth in applicants' copending application filed on even date entitled "Acid Contacted Enhanced Adsorbent Particle and Method of making and Using Therefor" and as set forth in the parent applications to that application as listed above, and then dried at 121° C. for 90 minutes.

The removal of TCE from aqueous solution was investigated using a number of adsorbent and/or catalyst and binder systems of the present invention, and these results are summarized in Table 6. In Entry 8, 99% reduction of TCE was observed when the particle consisted of 40% CuO, 40% $MnO_2$, and 20% colloidal alumina as the binder. When no binder was used, however, the $CuO/MnO_2$ particle removed only 0–1% of TCE (Entries 9A 9B). These results indicate the necessity of the binder material to enhance or provide adsorbent and/or catalytic properties of or to the particle. Other particles demonstrated the ability to remove TCE. For example, entry 1 removed >95% of TCE. Entry 7 removed 99% of TCE. The particle of entry 7 had two adsorbent and/or catalyst particles, one of which was carbon. Carbon was also used in conjunction with multiple metal oxide components (Entry 24A and B) to remove TCE (>90%).

Although Entry 3 removed 96% of TCE, the PVP binder does not hold the particle together as long as the binders of the present invention. Particles with the PVP binder disintegrated over time, which reduced the usefulness of the particle. In the case of Entries 5A, 5B and 6, TCE removal was very high (98%); however, the activated peat also breaks apart much faster than the particles of the present invention. The contaminants adsorbed by the peat may also leach into the environment.

Not wishing to be bound by theory, two plausible mechanisms can account for the catalytic degradation of TCE using the particles of the present invention. The first mechanism involves redox chemistry between TCE and the metal oxide components of the particle. TCE is electrophilic, and can stabilize a negative charge if reduced. Electron transfer from a metal oxide component to TCE may be the first step toward the degradation of TCE. A second mechanism involves a Lewis acid-base interaction between TCE and the metal oxide component, which increases the rate of nucleophilic attack of TCE by water. Due to the lone pair electrons on the chlorine groups of TCE, a metal oxide component can initially coordinate to the chlorine group. This initial coordination may also be the first step toward the catalytic degradation of TCE.

TABLE 6

| Entry | Binder (Wt %) | Drying/ Crosslinking temperature ° C. (time min) | $Al_2O_3$ wt % (Calcining temperature, ° C.), Acid treated | CuO (Wt %) | $MnO_2$ (Wt %) | Other Component(s) (wt %) | TCE influent concentration Run A | TCE effluent concentration 5th bed volume (% reduction) Run A | TCE influent concentration Run B | TCE effluent concentration 5th bed volume (% reduction) Run B |
|---|---|---|---|---|---|---|---|---|---|---|
| 1 | V-900 (20) | 150 (15) | 70 (550) | 5 | 5 | | 1.0 ppm | <50 ppb (>95%) | | |
| 2 | PVP (3.2) | 150 (30) | 91.3 (550) | 2.5 | 2.5 | MethylCellulose (0.5) | 50.0 ppm | 29.4 ppm (59) | 5.0 ppm | 0.5 ppm (90) |
| 3 | PVP (3.2) | 150 (30) | 91.3 (550) | 2.5 | 2.5 | MethylCellulose (0.5) | 5.0 ppb | 0.20 ppb (96) | | |
| 4 | | NA | | | | Zeolite (100) | rejected* | | | |
| 5 | | NA | | | | Acid treated Peat (100) | 50.0 ppm | 1.0 ppm (98) | 5.0 ppm | 0.1 ppb (98) |
| 6 | | NA | | | | Acid treated Peat | 5.0 ppb | 0.07 ppb (98) | | |

TABLE 6-continued

| Entry | Binder (Wt %) | Drying/ Crosslinking temperature ° C. (time min) | Al₂O₃ wt % (Calcining temperature, ° C.), Acid treated | CuO (Wt %) | MnO₂ (Wt %) | Other Component(s) (wt %) | TCE influent concentration Run A | TCE effluent concentration 5th bed volume (% reduction) Run A | TCE influent concentration Run B | TCE effluent concentration 5th bed volume (% reduction) Run B |
|---|---|---|---|---|---|---|---|---|---|---|
| 7 | V-900 (20) | 250 (60) | 40 (500) | | | (100) WPH Carbon (40) | 5.0 ppb | 0.06 ppb (99) | | |
| 8 | V-900 (20) | 250 (60) | | 40 | 40 | | 5.0 ppb | 0.07 ppb (99) | | |
| 9 | | 250 (60) | | 50 | 50 | | 50.0 ppb | 50.4 ppb (0) | 50.0 ppm | 49.6 ppm (1) |
| 10 | V-900 (20) | 250 (60) | 60 (500) | 10 | 10 | | 50 ppm | 39.5 ppm (21) | 50.0 ppb | 39.9 ppm (20) |
| 11 | V-900 (20) | 250(60) | 70 (500) | 5 | 5 | | 50.0 ppm | 39.3 ppm (21) | 50.0 ppm | 45.8 ppm (8) |
| 12 | V-900 (20) | 250 (60) | | 10 | 10 | Zeolite (60) | 50.0 ppm | 37.2 ppm (26) | 50.0 ppb | 41.0 ppb (18) |
| 13 | | 250(60) | 100 (550) | | | | 50.0 ppm | 21.2 ppm (58) | 50.0 ppb | 34.0 ppb (32) |
| 14 | V-900 (20) PVP (3) | 250 (60) | 67 (550) | 5 | 5 | | rejected** | | | |
| 15 | V-900 (20) PVP (3) | 250 (60) | 71.6 (550) | 2.5 | 2.5 | MethylCellulose (0.4) | rejected** | | | |
| 16 | V-900 (17) | 250 (60) | 13.6 (550) | 1.7 | 1.7 | Tin (66) | rejected** | | | |
| 17 | V-900 (13.6) | 250(60) | 17 (550) | 1.7 | 1.7 | Zinc (66) | rejected** | | | |
| 18 | V-900 (13.6) | 250 (60) | 17 (550) | 1.7 | 1.7 | | 50.0 ppm | 42.8 ppm (14) | 50.0 ppb | 44.4 ppb (11) |
| 19 | V-900 (20) | 250 (60) | 17 (550) | 1.7 | 1.7 | Tin (66) | 50.0 ppm | 36.3 ppm (27) | 50.0 ppb | 41.9 ppb (16) |
| 20 | V-900 (20) | 250 (60) | 17 (550) | 1.7 | 1.7 | Zinc (59.6) | 50.0 ppm | 27.8 ppm (44) | 50.0 ppb | 27.0 ppb (46) |
| 21 | V-900 (20) | 250 (60) | 70 (550) | 5 | 5 | | 50.0 ppm | 24.8 ppm (50) | 50.0 ppb | 17.5 ppb (65) |
| 22 | V-900 (20) | 550 (60) | 70 (550) | 5 | 5# | | 50.0 ppm | 42.7 ppm (15) | 50.0 ppb | 20.3 ppb (59) |
| 23 | | NA | | | | WPH Carbon (100) | rejected* | | | |
| 24 | V-900 (19.9) | 250 (60) | 59.7 (550) | 5.98 | 4.98 | WPH Carbon (9.95) Avicel Cellulose (0.5) | 50.0 ppm | <5.0 ppm) (>90) | 50.0 ppb | 3.9 ppb (92) |
| 25 | Sol P2 (20) | 250 (60) | 70 (550) | 5 | 5 | | 50.0 ppm | 5.8 ppm (88) | 50.0 ppb | 11.3 ppb (77) |

*sample did not allow water flow
**particle fell apart upon use
PVP = GAF PVP K60 Polyvinylpyrrolidone
V-900 = LaRoche V-900 gel alumina (colloidal alumina)
Sol P2 = Condea Disperal Sol P2 (colloidal alumina)
Zeolite = Zeolyst international CBV 100
CuO = Fisher C472
MnO₂ = Kerr-McGee KM ® Electrolytic Manganese Dioxide 92% MnO2 X-ray powder diffraction studies indicate this to be a mixture of manganese oxides.
Tin = Fisher T128
Zinc = Fisher Z16
MethylCellulose = Fisher M352
WHP Carbon = Calgon WPH powdered activate carbon
particle heated to 550° C. in air to convert MnO₂ to Mn₃O₄
NA = not applicable

EXAMPLE 9

Various adsorbent and/or catalyst and binder systems of Table 7 were prepared according to the procedures of Examples 7 and Example 8 (aluminum oxide preparation). Samples were tested to determine if they reacted with hydrogen sulfide at room temperature. Hydrogen sulfide was generated by treating sodium sulfide with sulfuric acid and vacuum transferred into an IR cell which had been loaded with 1.00 g of adsorbent and/or catalyst binder system to be tested. The IR cell used was 9 cm long by 4 cm in diameter (~120 mL volume). The cell was filled to approximately 170 torr H₂S and observed visually and IR spectra recorded.

The percent composition of each component as well as the nature of the binder are presented in Table 7. The aluminum oxide particle was first calcined at 550°, then acid washed using 0.5% acetic acid and dried at 121° C. for 90 minutes using the same procedure described in Example 8. The cross-linking temperature for each particle was 250° C. for 1 hour.

The removal of hydrogen sulfide using the adsorbent and/or catalyst and binder systems of the present invention was investigated, and these results are summarized in Table 7. The removal of hydrogen sulfide by the adsorbent and/or catalyst binder systems was monitored by infrared spectroscopy. Based on these results, adsorbent and/or catalyst and binder systems of colloidal aluminum binder, acid treated aluminum oxide, and copper oxide provided the best results with regards to the removal of hydrogen sulfide.

TABLE 7

| Entry | Binder (Wt %) | Al₂O₃ wt % | ZnO wt % | CuO wt % | Length of Experiment to Remove H₂S | H₂S reacted | Comments |
|---|---|---|---|---|---|---|---|
| 1 | V-900 (40) | 50 | 10 | | 16 h | Yes | Virtually all absorbed as determined IR |
| 2 | V-900 (50) | 40 | 10 | | 24 h | Yes | Virtually all absorbed as determined IR |
| 3 | V-900 (60) | 30 | 10 | | 42 h | Yes | Discoloration observed after 4 h |

TABLE 7-continued

| Entry | Binder (Wt %) | $Al_2O_3$ wt % | ZnO wt % | CuO wt % | Length of Experiment to Remove $H_2S$ | $H_2S$ reacted | Comments |
|---|---|---|---|---|---|---|---|
| 4 | V-900 (20) | 60 | 10 | 10 | 24 h | Yes | Virtually all absorbed as determined IR |
| 5 | V-900 (20) | 60 | 20 | | 2 h | Yes | Virtually all absorbed as determined IR Discoloration observed after 2 h |
| 6 | V-900 (25) | 70 | | 5 | 2 h | Yes | Virtually all absorbed as determined IR Discoloration observed after 2 h |
| 7 | V-900 (38) | 60 | | 2 | 3 h | Yes | Virtually all absorbed as determined IR Discoloration observed after 3 h |
| 8 | V-900 (30) | 50 | | 20 | 1.5 h | Yes | Virtually all absorbed as determined IR Discoloration observed after 1.5 h |
| 9 | V-900 (30) | 20 | | 50 | 16.5 h | Yes very slowly | Virtually all absorbed as determined IR Very slow little change after 2 h |
| 10 | V-900 (30) | 69 | | 1 | 4 h | Yes | Discoloration observed after 2 h Virtually all absorbed as determined IR |

$Al_2O_3$ = calcined at 550° C. and then acid treated
V-900 = LaRoach V-900 gel alumina (colloidal alumina)

EXAMPLE 10

TCE adsorption and TCLP extraction procedures were performed as follows. A 20.0114-gram (about 24.50 mL bed volume) sample of the colloidal alumina and $Al_2O_3$/CuO/$MnO_2$ combination particle of Table 7, entry 1, after treatment with TCE was wet packed into a 50-mL buret (with removable stopcock) plugged with glass wool. The sample was charged with five bed volumes of water. The sorbent material was then quantitatively transferred into the Zero Headspace Extractor (ZHE) apparatus into which 200 mL of water was added, appropriately sealed and agitated for 18 hours. The filtered solution was collected in two 100 mL vials, stored in the refrigerator at 4° C. until analysis by GC/MS. The Finnigan MAT Magnum ion trap GC/MS equipped with a Tekmar liquid sample concentrator (LSC 2000) was used for analysis.

The calibration curve procedure was as follows. A freshly prepared 50 ppm TCE stock solution was obtained by dissolving 34.2 µl spectrophotometric grade TCE (Aldrich) in 20 ml HPLC grade methanol (Fisher) followed by dilution to a liter. Dilution of this solution (1000 µl: 1L) resulted in a 50 ppb TCE stock solution. All dilutions were accomplished using deionized water. A calibration curve was constructed by purging 1.0, 0.50, 0.20, 0.10, and 0.050 ppb TCE solutions.

The results are set forth below in Table 3.

TABLE 3

| Sorbent Sample | TCE found, ppb | TCE Detection limit, ppb |
|---|---|---|
| Table 7, entry 1 | Nd[a] | 0.0050 |

[a] = Not detected. The fact that TCE in the sample is less that 500 ppb (EPA TCLP limit) characterizes it as a nonhazardous waste with respect to TCE.

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for producing an enhanced adsorbent and/or enhanced catalytic particle and/or for producing a catalytic particle, comprising the steps of:
   (a) removing an effective amount of air from a closed chamber containing an adsorbent and/or catalytic particle, wherein the resultant chamber pressure is less than one atmosphere;
   (b) raising the chamber pressure with an inert gas to at least one atmosphere;
   (c) contacting the particle with a targeted energy beam of sufficient energy for a sufficient time to thereby enhance the adsorbent and/or catalytic properties of the particle and/or produce catalytic properties in the particle.

2. The method of claim 1, wherein the particle comprises an oxide particle or activated carbon.

3. The method of claim 1, wherein the particle comprises an oxide of metal, an oxide of silicon or activated carbon.

4. The method of claim 1, wherein the particle comprises aluminum oxide, titanium dioxide, copper oxide, vanadium pentoxide, silicon dioxide, manganese dioxide, iron oxide, zinc oxide, activated carbon, or zeolite.

5. The method of claim 1, wherein the particle comprises aluminum oxide.

6. The method of claim 5, further comprising a second particle of titanium dioxide, copper oxide, vanadium pentoxide, silicon dioxide, manganese dioxide, iron oxide, zinc oxide, activated carbon, or zeolite.

7. The method of claim 1, wherein the particle comprises aluminum oxide and activated carbon.

8. The method of claim 7, wherein the particle further comprises silicon dioxide and wherein the activated carbon is a mixture of coal based and coconut based activated carbon.

9. The method of claim 1, wherein the particle is an agglomeration of smaller particles and a binder.

10. The method of claim 9, wherein the smaller particles are of different composition type.

11. The method of claim 1, wherein in step (b) the chamber gauge pressure is from 1 psi to 5,000 psi.

12. The method of claim 1, wherein in step (b) the chamber gauge pressure is at least 100 psi, and further comprising after step (c), rapidly decompressing the chamber pressure to thereby increase the surface area of the particle.

13. The method of claim 12, wherein in step (b) the chamber gauge pressure is at least 5,000 psi.

14. The method of claim 1, wherein the inert gas is argon.

15. The method of claim 1, wherein the energy be am is an ion or electron beam.

16. The method of claim 1, wherein the method produces a room temperature catalytic particle.

17. The particle made by the process of claim 1.

18. The particle made by the process of claim 4.

19. The particle made by the process of claim 5.

20. The particle made by the process of claim 6.

21. The particle made by the process of claim 12.

22. The method of claim 1, wherein the sufficient energy is from 1 to 100 eV.

23. The method of claim 1, wherein the sufficient energy is from 15 to 25 eV.

24. The method of claim 1, wherein the adsorbent and/or catalytic particle comprises at least two types of particles and further comprises a binder comprising colloidal metal oxide or colloidal metalloid oxide.

25. The method of claim 24, wherein the binder is cross-linked to at least one of the particle types or to itself.

26. The method of claim 1, further comprising after step (c), (d) mixing the particle with at least one other-type of adsorbent and/or catalyst particle, a binder comprising colloidal metal oxide or colloidal metalloid oxide, and an acid; and (e) heating the mixture to a sufficient temperature for a sufficient time to cross-link the binder to at least one type of particle or to itself.

27. The particle of claim 17, wherein the adsorbent and/or catalytic particle comprises at least two types of particles made by the process of claim 1 and further comprises a binder comprising colloidal metal oxide or colloidal metalloid oxide.

28. The particle of claim 27, wherein the binder is cross-linked to at least one of the particle types or to itself.

29. An adsorbent and/or catalyst and binder composition comprising the particle made by the process of claim 1 and further comprising a second type of adsorbent and/or catalyst particle and a binder comprising colloidal metal oxide or colloidal metalloid oxide.

30. The composition of claim 29, wherein the binder is cross-linked to at least one of the particle types or to itself.

31. The method of claim 5, wherein the aluminum oxide is a non-amorphous, non-ceramic, crystalline, porous, calcined, aluminum oxide particle that was produced by calcining at a particle temperature of from 400° C. to 700° C.

32. The method of claim 1, wherein the particle comprises an oxide of aluminum, titanium, copper, vanadium, silicon, manganese, iron, zinc, zirconium, tungsten, rhenium, arsenic, magnesium, thorium, silver, cadmium, tin, lead, antimony, ruthenium, osmium, cobalt or nickel or zeolite.

33. The method of claim 1, wherein the particle comprises $Al_2O_3$, $TiO_2$, $CuO$, $Cu_2O$, $V_2O_5$, $SiO_2$, $MnO_2$, $Mn_2O_3$, $Mn_3O_4$, $ZnO$, $WO_2$, $WO_3$, $Re_2O_7$, $As_2O_3$, $As_2O_5$, $MgO$, $ThO_2$, $Ag_2O$, $AgO$, $CdO$, $SnO_2$, $PbO$, $FeO$, $Fe_2O_3$, $Fe_3O_4$, $Ru_2O_3$, $RuO$, $OsO_4$, $Sb_2O_3$, $CoO$, $Co_2O_3$, or $NiO$.

34. The method of claim 1, wherein the the particle comprises non-amorphous, non-ceramic, crystalline, porous aluminum oxide that was calcined at a particle temperature of from 400° C. to 700° C.

35. The method of claim 1, wherein the ion beam comprises a broad beam ion source or a wide beam photoionizer.

36. The method of claim 1, wherein the sufficient energy is from 10 to 50 eV.

37. The method of claim 1, wherein the inert gas comprises a noble gas.

38. The method of claim 24, wherein the binder comprises colloidal aluminum oxide or colloidal silicon dioxide.

* * * * *

UNITED STATES PATENT AND TRADEMARK OFFICE
CERTIFICATE OF CORRECTION

PATENT NO. : 5,955,393
DATED : September 21, 1999
INVENTOR(S) : Moskovitz and Kepner It is certified that error appears in the above-indentified patent and that said Letters Patent is hereby corrected as shown below:

Cover page [63], please delete the priority claim and insert therefor --(1) Continuation-in-part of PCT/US96/05303, filed April 17, 1996, which is a continuation-in-part of U.S. application serial No. 08/426,981, filed April 21, 1995, abandoned and (2) continuation-in-part of U.S. application serial No. 08/426,981, filed April 21, 1995, abandoned.--

Signed and Sealed this

Seventeenth Day of April, 2001

Attest:

NICHOLAS P. GODICI

Attesting Officer    Acting Director of the United States Patent and Trademark Office